US010797750B2

(12) United States Patent
Jin et al.

(10) Patent No.: US 10,797,750 B2
(45) Date of Patent: Oct. 6, 2020

(54) SYSTEM ARCHITECTURE FOR SUPPORTING DIGITAL PRE-DISTORTION AND FULL DUPLEX IN CABLE NETWORK ENVIRONMENTS

(71) Applicant: CISCO TECHNOLOGY, INC., San Jose, CA (US)

(72) Inventors: Hang Jin, Plano, TX (US); John T. Chapman, Coto de Caza, CA (US)

(73) Assignee: Cisco Technology, Inc., San Jose, CA (US)

(*) Notice: Subject to any disclaimer, the term of this patent is extended or adjusted under 35 U.S.C. 154(b) by 766 days.

(21) Appl. No.: 15/352,445

(22) Filed: Nov. 15, 2016

(65) Prior Publication Data
US 2017/0244445 A1    Aug. 24, 2017

Related U.S. Application Data

(63) Continuation-in-part of application No. 15/247,580, filed on Aug. 25, 2016, now Pat. No. 9,712,193, and
(Continued)

(51) Int. Cl.
*H04B 3/23* (2006.01)
*H04L 5/14* (2006.01)
*H04L 12/28* (2006.01)

(52) U.S. Cl.
CPC ............... *H04B 3/23* (2013.01); *H04B 3/232* (2013.01); *H04L 5/14* (2013.01); *H04L 5/1461* (2013.01); *H04L 12/2801* (2013.01)

(58) Field of Classification Search
CPC ....... H04B 3/23; H04B 3/232; H04L 12/2801; H04L 5/1461; H04L 5/14
See application file for complete search history.

(56) References Cited

U.S. PATENT DOCUMENTS 6,054,896 A * 4/2000 Wright .................. H03F 1/0294
330/149
6,570,444 B2    5/2003 Wright
(Continued)

FOREIGN PATENT DOCUMENTS

EP    0182096 A2    5/1986
EP    0936781 A1    8/1999
(Continued)

OTHER PUBLICATIONS

Choi, S., et al., "Adaptive Predistortion With Direct Learning Based on Piecewise Linear Approximation of Amplifier Nonlinearity." IEEE Journal of selected topics in signal processing, vol. 3, No. 3, Jun. 2009, 8 pages; http://koasas.kaist.ac.kr/bitstream/10203/12085/1/65.pdf.
(Continued)

*Primary Examiner* — Hassan Kizou
*Assistant Examiner* — Hector Reyes
(74) *Attorney, Agent, or Firm* — Merchant & Gould P.C.

(57) ABSTRACT

An example apparatus for supporting digital pre-distortion (DPD) and full duplex (FDX) in cable network environments is provided and includes a first path for signals being transmitted out of the apparatus, a second path for signals being received into the apparatus, a DPD actuator located on the first path, an amplifier located on the first path, an echo cancellation (EC) actuator located on the second path, and a data interface including a plurality of channels connecting the apparatus to a signal processor. DPD coefficients, EC coefficients and delay parameters are provided over the data interface from the signal processor to the apparatus. The DPD actuator predistorts signals on the first path using the DPD coefficients compensating for distortions introduced by the amplifier, and the EC actuator reduces interferences in signals on the second path using the EC coefficients and the
(Continued)

delay parameters, facilitating FDX communication by the apparatus.

18 Claims, 13 Drawing Sheets

Related U.S. Application Data a continuation-in-part of application No. 15/052,499, filed on Feb. 24, 2016, now Pat. No. 9,966,993, and a continuation-in-part of application No. 15/052,428, filed on Feb. 24, 2016, now Pat. No. 9,942,024.

(60) Provisional application No. 62/321,577, filed on Apr. 12, 2016.

(56) References Cited

U.S. PATENT DOCUMENTS

| | | | |
|---|---|---|---|
| 6,725,462 | B1 | 4/2004 | Kaplan |
| 6,757,384 | B1* | 6/2004 | Ketchum ............ H04M 9/082 379/406.01 |
| 6,912,209 | B1 | 6/2005 | Thi et al. |
| 7,414,470 | B2 | 8/2008 | Okazaki |
| 7,856,049 | B2 | 12/2010 | Currivan et al. |
| 8,457,584 | B2 | 6/2013 | Currivan |
| 8,565,266 | B1 | 10/2013 | Fox et al. |
| 8,594,118 | B2 | 11/2013 | Cooper et al. |
| 9,031,409 | B2 | 5/2015 | Nandiraju et al. |
| 8,937,992 | B2 | 6/2015 | Cooper et al. |
| 9,136,943 | B2 | 9/2015 | Thompson et al. |
| 9,160,463 | B2 | 10/2015 | Hunter |
| 9,172,429 | B2 | 10/2015 | Gerszberg et al. |
| 9,270,231 | B2 | 2/2016 | Utsunomiya et al. |
| 9,276,617 | B2 | 3/2016 | Schafferer et al. |
| 9,712,193 | B1 | 7/2017 | Jin |
| 9,735,814 | B1 | 8/2017 | Jin et al. |
| 9,775,116 | B2 | 9/2017 | Abdelmonem et al. |
| 2001/0038423 | A1 | 11/2001 | Twitchell et al. |
| 2002/0032004 | A1 | 3/2002 | Widrow |
| 2003/0058959 | A1 | 3/2003 | Rafie |
| 2004/0179629 | A1 | 9/2004 | Song |
| 2005/0105642 | A1 | 5/2005 | Muller |
| 2005/0258898 | A1 | 11/2005 | Hongo |
| 2006/0262722 | A1 | 11/2006 | Chapman et al. |
| 2010/0220810 | A1* | 9/2010 | Jin ........................ H04L 27/368 375/296 |
| 2011/0149764 | A1 | 6/2011 | Wietfeldt et al. |
| 2011/0170473 | A1 | 7/2011 | Proctor, Jr. et al. |
| 2012/0269242 | A1 | 10/2012 | Prodan et al. |
| 2012/0275792 | A1 | 11/2012 | Nandiraju et al. |
| 2013/0101116 | A1 | 4/2013 | Ross et al. |
| 2013/0114480 | A1 | 5/2013 | Chapman et al. |
| 2013/0194984 | A1 | 8/2013 | Cheng et al. |
| 2013/0332978 | A1 | 12/2013 | Rakib |
| 2014/0010269 | A1 | 1/2014 | Ling et al. |
| 2014/0022926 | A1 | 1/2014 | Ling et al. |
| 2014/0022943 | A1 | 1/2014 | Ling et al. |
| 2014/0133352 | A1 | 5/2014 | Chapman et al. |
| 2015/0082363 | A1 | 3/2015 | Gomez et al. |
| 2015/0188653 | A1 | 7/2015 | Hanks et al. |
| 2015/0188668 | A1 | 7/2015 | Al-banna |
| 2015/0257165 | A1 | 9/2015 | Gale et al. |
| 2015/0382361 | A1 | 12/2015 | Sabapathi et al. |
| 2016/0065250 | A1 | 3/2016 | Volokhine et al. |
| 2016/0080009 | A1* | 3/2016 | Bilek ................... H04B 1/0475 375/297 |
| 2017/0019146 | A1 | 1/2017 | Jin et al. |
| 2017/0019239 | A1 | 1/2017 | Jin et al. |
| 2017/0019241 | A1 | 1/2017 | Jin et al. |
| 2017/0019242 | A1 | 1/2017 | Jin et al. |
| 2017/0033915 | A1 | 2/2017 | McCoy et al. |
| 2017/0085398 | A1 | 3/2017 | Liu |
| 2017/0104506 | A1 | 4/2017 | Liu et al. |

FOREIGN PATENT DOCUMENTS

| | | |
|---|---|---|
| EP | 1374511 B1 | 1/2004 |
| EP | 1429470 A2 | 6/2004 |
| EP | 1705824 A2 | 9/2006 |
| EP | 2244380 A1 | 1/2010 |
| EP | 2244380 A1 | 10/2010 |
| EP | 2879301 A1 | 6/2015 |
| WO | 2013095386 A1 | 6/2013 |
| WO | 2013126297 A1 | 8/2013 |
| WO | 2015021461 A1 | 2/2015 |
| WO | 2015162104 A1 | 10/2015 |
| WO | 2016033266 A1 | 3/2016 |
| WO | 2017011142 A1 | 1/2017 |
| WO | 2017011143 A1 | 1/2017 |
| WO | 2017011144 A1 | 1/2017 |
| WO | 2017011146 A1 | 1/2017 |

OTHER PUBLICATIONS

USPTO Jan. 12, 2017 Non-Final Office Action from U.S. Appl. No. 15/247,580.

Notice of Allowance issued in U.S. Appl. No. 15/052,466, dated Mar. 27, 2018, 11 pages.

International Search Report dated Jan. 26, 2018 cited in Application No. PCT/US2017/061607, 13 pgs.

International Search Report dated Jan. 29, 2018 cited in Application No. PCT/US2017/061574, 14 pgs.

European Combined Search and Examination Report dated Nov. 24, 2017 cited in Application No. GB1708266.0, 7 pgs.

U.S. Office Action dated Dec. 14, 2017 cited in U.S. Appl. No. 15/052,466, 38 pgs.

USPTO Mar. 30, 2017 Notice of Allowance from U.S. Appl. No. 15/247,580.

U.S. Appl. No. 15/247,580, filed Aug. 25, 2016, entitled "High Power Efficient Amplifier Through Digital Pre-Distortion and Machine Learning in Cable Network Environments," Inventor(s): Hang Jin, et al.

U.S. Appl. No. 15/052,428, filed Feb. 24, 2016, entitled "Full Duplex Network Architecture in Cable Network Environments," Inventors: Hang Jin, et al.

U.S. Appl. No. 15/052,499, filed Feb. 24, 2016, entitled "Interference Suppression in Full Duplex Cable Network Environments," Inventors: Hang Jin, et al.

Jon Schnoor et al., "Leveraging Full Band RF Capture to Improve the Customer Experience and Operational Performance," ubeeinteractive, White Paper, First Published on or about Jan. 5, 2015, 22 pgs.

EP Extended Search Report dated Sep. 28, 2017 cited in Application No. 17165267.0, 7 pgs.

International Search Report and Written Opinion dated Sep. 22, 2016 cited in Application No. PCT/US2016/038269, 12 pgs.

International Search Report and Written Opinion dated Sep. 30, 2016 cited in Application No. PCT/US2016/038272, 12 pgs.

International Search Report and Written Opinion dated Oct. 17, 2016 cited in Application No. PCT/US2016/038268, 12 pgs.

International Search Report and Written Opinion dated Dec. 6, 2016 cited in Application No. PCT/US2016/038270, 17 pgs.

U.S. Office Action dated Jan. 12, 2017 cited in U.S. Appl. No. 15/352,438, 11 pgs.

U.S. Office Action dated Jul. 20, 2017 cited in U.S. Appl. No. 15/052,428, 22 pgs.

U.S. Office Action dated Aug. 10, 2017 cited in U.S. Appl. No. 15/052,499, 13 pgs.

European Office Action dated Nov. 7, 2017 cited in Application No. 17167831.1, 7 pgs.

Examination Report dated Apr. 14, 2019 in Application No. GB17082660.0, 4 pages.

Examination Report dated Oct. 22, 2019, in Application No. GB17082660.0, 4 pages.

Katz, Allen et al. "The Evolution of PA Linearization" IEEE Microwave Magazine, Feb. 2016, (Digital Object Identifier 10.1109/MMM.2015.24.98079 Jan. 14, 2016 (8 pgs.).

(56) References Cited

OTHER PUBLICATIONS

Kim, Wan-Jong "Digital Predistortion Linearizes Wireless Power Amplifiers" IEE Microwave Magazine, Sep. 2005 (8 pgs).
Murano, Kazuo et al. "Echo Cancellation and Applications" IEE Communications Magazine, Jan. 1990 (7 pgs.).

* cited by examiner

SYSTEM ARCHITECTURE FOR SUPPORTING DIGITAL PRE-DISTORTION AND FULL DUPLEX IN CABLE NETWORK ENVIRONMENTS

CROSS-REFERENCE TO RELATED APPLICATION

This application claims the benefit of priority under 35 U.S.C. § 119(e) to U.S. Provisional Application Ser. No. 62/321,577 entitled "DIGITAL PRE-DISTORTION MECHANISMS IN CABLE NETWORKS," filed Apr. 12, 2016, which is hereby incorporated by reference in its entirety. This application is also a continuation-in-part (CIP) and claims the benefit of priority under 35 U.S.C. § 120 to U.S. Non-Provisional application Ser. No. 15/247,580 entitled HIGH POWER EFFICIENT AMPLIFIER THROUGH DIGITAL PRE-DISTORTION AND MACHINE LEARNING IN CABLE NETWORK ENVIRONMENTS, filed Aug. 25, 2016, which is hereby incorporated by reference in its entirety. This application is also a CIP and claims the benefit of priority under 35 U.S.C. § 120 to U.S. Non-Provisional application Ser. No. 15/052,499 entitled "INTERFERENCE SUPPRESSION IN FULL DUPLEX CABLE NETWORK ENVIRONMENTS," filed Feb. 24, 2016; and to U.S. Non-Provisional application Ser. No. 15/052,428 entitled "FULL DUPLEX NETWORK ARCHITECTURE IN CABLE NETWORK ENVIRONMENTS," filed Feb. 24, 2016, which are hereby incorporated by reference in their entireties.

TECHNICAL FIELD

This disclosure relates in general to the field of communications and, more particularly, to a system architecture for supporting digital pre-distortion and full duplex in cable network environments.

BACKGROUND

Driven by 50% growth rate in bandwidth consumption, cable network operators are increasingly focused on cost-performance of the Hybrid Fiber Coaxial (HFC) network. Consumers are expected to turn to progressively higher volume of Internet Protocol content and services. As a result, cable network operators are seeking technology solutions that provide a low cost per bit for their cable networks. A dominant part of the cost is electrical power consumption by various components in the network. The cost of electrical power to the cable industry is approximately $1 B in 2015, and expected to rise to $4 B in 2020. A majority of the power is consumed by HFC amplifiers in the cable network. Amplifiers are provided along the cables to boost signal power. For example, an average of ten amplifiers are provided along a length of three miles, or thereabouts, throughout the cable network. Yet, typical amplifiers have low power efficiency, leading to greater power consumption with no proportionate increase in throughput.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example apparatus for supporting digital pre-distortion (DPD) and full duplex (FDX) in cable network environments is provided and includes a first path for signals being transmitted out of the apparatus, a second path for signals being received into the apparatus, a DPD actuator located on the first path, an amplifier located on the first path, an echo cancellation (EC) actuator located on the second path, and a data interface including a plurality of channels connecting the apparatus to a signal processor. DPD coefficients, EC coefficients and delay parameters are provided over the data interface from the signal processor to the apparatus. The DPD actuator predistorts signals on the first path using the DPD coefficients compensating for distortions introduced by the amplifier, and the EC actuator reduces interferences in signals on the second path using the EC coefficients and the delay parameters, facilitating FDX communication by the apparatus. As used herein, the term "coefficient" expresses a numerical or constant quantity placed before and multiplying a variable in an algebraic expression (e.g., 4 in $4x^y$).

Example Embodiments

Figure 1:
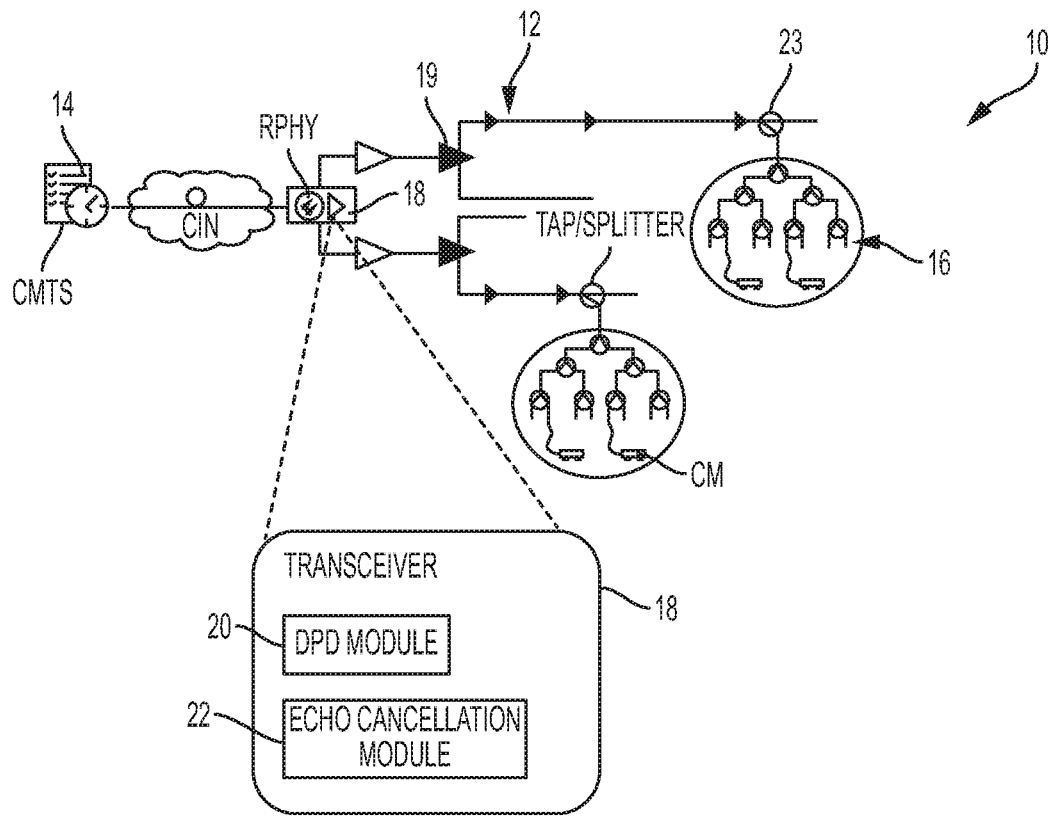
FIG. 1 is a simplified block diagram illustrating a communication system facilitating a system architecture for supporting digital pre-distortion and full duplex in cable network environments.

Turning to FIG. 1, FIG. 1 is a simplified block diagram illustrating a communication system 10 for supporting digital pre-distortion and full duplex in cable network environments in accordance with one example embodiment. FIG. 1 illustrates a cable network 12 (indicated generally by an arrow) facilitating communication between a cable modem termination system (CMTS) 14 and one or more cable modems (CMs) 16. Network 12 includes transceivers 18, stand-alone Hybrid-Fibre Coaxial (HFC) radio frequency (RF) amplifiers 19, digital pre-distortion (DPD) module(s) 20, Echo Cancellation (EC) module(s) 22, and taps and splitters 23 (in addition to various other components that are not shown in detail in the figure).

According to various embodiments, transceivers 18 and stand-alone amplifiers 19 enable full band communication for both upstream and downstream network traffic and implement dynamic interference cancellation, also referred to herein as adaptive interference cancellation (AIC). Amplifiers 19 enable full band communication for both upstream and downstream network traffic, and implement AIC with ringing (e.g., echo) suppression. Taps and splitters 23 may enable full band communication for downstream and upstream traffic. In addition, any amplification of signals within transceivers 18 and amplifiers 19 may also be in conjunction with DPD mechanisms. To facilitate DPD and full band duplex (FDX) communication in cable network 12, at least one DPD module 20 and at least one EC module 22 may be incorporated into transceivers 18 and amplifiers 19. In a general sense, network 12 may comprise a plurality of DPD modules 20 and EC modules 22.

Embodiments of communication system 10 can resolve bandwidth limitation issues by enabling full duplex communication using appropriately configured components (among other techniques). Full duplex communication can be successfully implemented by suppressing (e.g., eliminating) transmitted signals that are coupled back to the receiver (e.g., as an echo, as an upstream signal leaking into the downstream pathway and vice versa, etc.). Sufficient transmitted signal cancellation and/or elimination can be achieved by leveraging (among other parameters) state of art devices and digital signal processing technologies, high speed and high performance (e.g., high resolution) analog to digital converters (ADC), powerful devices with more signal processing capability, appropriate AIC algorithms, and advanced MAC scheduling for spectrum sharing. In various embodiments, the AIC algorithm suppresses at a receiver (of transceiver 18 or amplifier 19 appropriately) a signal transmitted by a transmitter (of transceiver 18 or amplifier 19 appropriately). Further, in addition to the AIC algorithm, full band amplifier 19 implements a ringing suppression scheme with more than one EC module 22.

Turning to the infrastructure of communication system 10, the network topology can include any number of cable modems, customer premises equipment, servers, switches (including distributed virtual switches), routers, amplifiers, taps, splitters, combiners and other nodes inter-connected to form a large and complex network. Network 12 represents a series of points or nodes of interconnected communication pathways for receiving and transmitting packets and/or frames of information that are delivered to communication system 10. A node may be any electronic device, computer, printer, hard disk drive, client, server, peer, service, application, or other object capable of sending, receiving, amplifying, splitting, or forwarding signals over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Cable network 12 offers a communicative interface between cable network components, and may include any local area network (LAN), wireless local area network (WLAN), metropolitan area network (MAN), Intranet, Internet, Extranet, wide area network (WAN), virtual private network (VPN), or any other appropriate architecture or system that facilitates communications in a network environment. Network 12 may implement any suitable communication protocol for transmitting and receiving data packets within communication system 10. The architecture of the present disclosure may include a configuration capable of DOCSIS, TCP/IP, TDMA, and/or other communications for the electronic transmission or reception of signals in a network. The architecture of the present disclosure may also operate in conjunction with any suitable protocol, where appropriate and based on particular needs. In addition, gateways, routers, switches, and any other suitable nodes (physical or virtual) may be used to facilitate electronic communication between various nodes in the network.

In some embodiments, a communication link may represent any electronic link supporting a network environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), coaxial fiber, telephone lines, T1 lines, T3 lines, wireless, satellite, fiber optics, cable, Ethernet, etc. or any combination thereof) and/or through any additional networks such as a wide area networks (e.g., the Internet).

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

In particular embodiments, CMTS 14 may comprise a hardware appliance with appropriate ports, processors, memory elements, interfaces, and other electrical and electronic components that facilitate the functions described herein, including providing high speed data services, such as cable Internet or voice over Internet Protocol (e.g., in the form of digital, RF, or other suitable signals) to cable subscribers, such as cable modems 16. In various embodiments, CMTS 14 comprises a Universal Broadband Router (uBR) with features that enable it to communicate with the HFC cable network via a suitable cable modem card, which provides an interface between the uBR protocol control information (PCI) bus and RF signals on the DOCSIS HFC cable network.

In some embodiments, CMTS 14 may comprise a converged cable access platform (CCAP) core that transmits and receives digital signals in IP protocols, coupled with one or more physical interface (PHY) transceiver(s), such as transceiver 18 that convert the digital IP signals into RF signals, and vice versa. The PHY transceivers, such as transceiver 18, may be co-located with the CCAP core at a common location, or may be located remote from the CCAP core and connected over a converged interconnect network (CIN). In some embodiments, CMTS 14 may comprise a single CCAP core and a plurality of PHY transceivers, such as transceiver 18. CMTS 14 is connected (e.g., communicatively coupled, for example, through wired communication channels) to cable modems 16, transceiver 18, and DPD modules 20 in cable network 12.

Transceivers 18 may comprise suitable hardware components and interfaces for facilitating the operations described herein. In some embodiments, transceivers 18 may be embedded in or be part of another hardware component, such as a broadband processing engine comprising a motherboard, microprocessors and other hardware components. In some embodiments, transceivers 18 comprise downstream and upstream PHY modules, deployed in a Coaxial Media Converter (CMC) that supports RF functions at the PHY layer. Transceivers 18 may comprise pluggable modules (e.g., small form-factor pluggable (SFP)) that may be plugged into a network element chassis, or embedded modules that attach to cables directly. In addition to optical and electrical interfaces, transceivers 18 include a PHY chip, appropriate digital signal processors (DSPs) and application specific integrated circuits (ASICs) according to particular needs. In various embodiments, the DSPs in transceivers 18 may be adapted (e.g., programmed) to perform echo cancellation and DPD functionalities as described herein.

Amplifiers 19 comprise RF amplifiers suitable for use in cable network 12. Amplifiers 19 are typically used at intervals in network 12 to overcome cable attenuation and passive losses of electrical signals caused by various factors (e.g., splitting or tapping the coaxial cable). Amplifiers 19 may include trunk amplifiers, distribution amplifiers, line extenders, house amplifier and any other suitable type of amplifier used in cable networks. According to various embodiments, substantially all amplifiers 19 are configured suitably as described herein to facilitate full duplex communication and DPD.

In various embodiments, DPD module 20 and EC module 22 comprise electrical circuits fabricated on integrated circuits, printed circuit boards, or other suitable platforms with appropriate transistors, conductors, resistors and other electrical components for facilitating various operations as described herein. In various embodiments, they comprise processors and memory elements for processing signals in real time, offline, or a combination of real time and offline.

Figure 2:
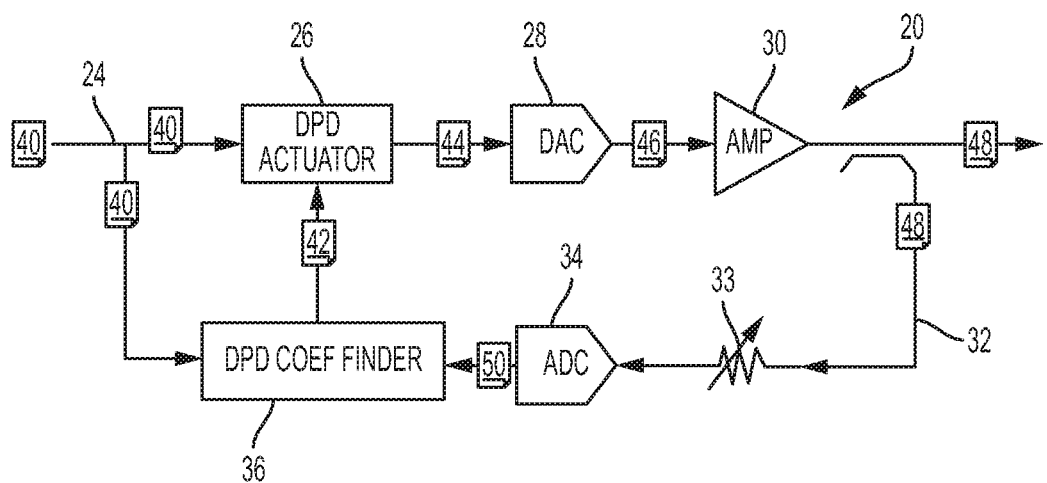
FIG. 2 is a simplified block diagram illustrating other example details of embodiments of the communication system.

Turning to FIG. 2, FIG. 2 is a simplified diagram illustrating example details of a logical arrangement of DPD module 20 according to an embodiment of communication system 10. DPD module 20 includes, on a transmission (TX) path 24: a digital pre-distortion (DPD) actuator 26, a digital to analog converter (DAC) 28 and an amplifier 30. Note that the term "path" as used herein refers to an electrical signal path, such as a conductor trace, that facilitates signals (e.g., signal transmission, signal communication, etc.) through an electrical circuit. On a reference path 32 is included an analog-to-digital converter (ADC) 34, and a DPD coefficient (coef) finder 36. According to various embodiments, an input signal 40 (in digital domain) entering DPD module 20 is forked (e.g., copied, bifurcated, split, branched, separated, sampled, etc.) into DPD coef finder 36, which outputs DPD coef 42 to DPD actuator 26. Note that in a general sense, signals flowing through cable network 12 comprise RF signals in multiple frequencies. For example, the RF signals may comprise digital data carried in at least two carrier waves of differing frequencies. The RF signals may be converted into the digital domain (e.g., using ADCs) before being input to DPD module 20. As used herein, "signal" denotes an electrical signal comprising a voltage or current; signals described herein can comprise analog signals (RF signals being an example) or digital signals.

DPD actuator 26 distorts input signal 40 using DPD coef 42 to generate pre-distorted signal 44. Pre-distorted signal 44 is converted to analog signal 46 by DAC 28. Analog signal 46 is amplified by amplifier 30 into amplified signal 48. As used herein, the term "amplifier" refers to an electrical or electronic circuit that increases the power of an electrical signal, such as a RF signal. In a general sense, the amplifier modulates the output of a power supply (e.g., source of electrical signals) to make the output signal stronger than the input signal. In various embodiments, amplifier 30 comprises a power amplifier operating in a frequency range between 20 kHz and 300 GHz in the RF domain.

Amplifier 30 introduces distortion into analog signal 46 in the amplification process due to its inherent properties, construction, and/or configuration. Amplified signal 48, which is output from amplifier 30, is forked into (e.g., sampled into) reference path 32, and converted into digital reference signal 50 in the digital domain by ADC 34. Reference signal 50 is fed to DPD coef finder 36, which compares reference signal 50 with input signal 40 to generate DPD coef 42. The process is performed iteratively until values of DPD coef 42 are such that any distortions due to amplifier 30 are canceled out (e.g., eliminated, reduced, etc.).

Typical power amplifiers used in cable networks, such as cable network 12, include high linearity low efficiency Class A amplifiers. High efficiency low linearity Class AB amplifiers may be used in cable networks but their non-linearity must be corrected to meet cable industry RF fidelity requirements (amplifier classes represent the amount of the output signal varying within the amplifier circuit over one cycle of operation when excited by a sinusoidal input signal).

A class-A amplifier is distinguished from other power amplifiers by the output stage device being biased for class A operation. Generally, the class A amplifier uses a single transistor (e.g., Bipolar, field effect transistor (FET), insulated-gate bipolar transistor (IGBT), etc.) connected in a common emitter configuration for both halves of an input waveform signal. The amplification process in Class-A is inherently linear. To achieve high linearity and gain, the output stage of a class A amplifier is biased "ON" (conducting) all the time. In other words, the transistor always has current flowing through it, even if it has no base signal. This means that the output stage is never driven fully into its cut-off or saturation regions but instead has a base biasing Q-point in the middle of its load line. Thus the transistor never turns "OFF" which is one of its main disadvantages. Due to this continuous loss of power, the class A amplifier generates large amount of heat adding to its low efficiency.

A class AB amplifier includes two transistors providing a push-pull operation, with each transistor operating similar to a class B amplifier, amplifying a complementary half (e.g., either positive half or negative half of sinusoidal signal) of the input signal. In a Class B amplifier, when the input signal goes positive, a positive biased transistor conducts while a negative biased transistor is switched "OFF". Likewise, when the input signal goes negative, the positive biased transistor switches "OFF" while the negative biased transistor turns "ON" and conducts the negative portion of the signal. In the class AB amplifier, each transistor will be ON for more than half a cycle, but less than a full cycle of the input signal, leading to better power efficiency than the Class A amplifier. However, signal distortion is introduced at a cross-over region (between one transistor turning OFF and the other turning ON), typically between −0.7V and +0.7V. Thus, Class AB has higher efficiency than Class-A at the price of linearity.

Traditional pre-distortion mechanisms attempt to correct for non-linear transfer characteristics of the amplifier by forming an inverse model of its transfer characteristic. The inverse model is applied to the low-level (unamplified) signal at the input of the amplifier in a nonlinear memoryless function to pre-distort the signal such that the amplified signal appears undistorted. The nonlinear memoryless function is updated periodically to account for variations in the amplifier transfer characteristics by monitoring the output from the amplifier.

Typical DPD systems use a DSP to pre-distort the input signal before upconversion to the RF domain and amplification. In some systems, digital samples of the input signal to the amplifier and the output signal from the amplifier are captured are fed to an estimator that calculates correction coefficients used by the DSP block to pre-distort the input signal. Due to the inherent limitations of the electronic circuitry, such traditional systems are limited in operation to 5 MHz signal bandwidth to meet standards of signal-to-noise ratio (SNR) performance of the network.

To overcome the bandwidth limitations for DPD purposes, at least one known system modifies the existing circuitry using different DACs to separately convert the input signal and the error correction signal (provided by the estimator to the DSP block). By reducing the power and/or bandwidth to be handled by any one DAC, available levels of quantization of the DAC are applied to a lower power signal, resulting in improved signal to noise ratio (as compared to systems that do not use separate DACs). The input signal is additionally separated into two or more sub-bands of narrower bandwidth; each of the sub-bands is converted to analog using a separate DAC. Each digital sub-band is passed through a correction filter, which is driven by the estimator to compensate for relative gain, phase, and delay inconsistencies between the different sub-bands. The technique relies on multiple DACs and multiple analog filters, which can lead to complicated circuitry.

Moreover, currently existing cable network technologies do not facilitate full duplex communication, which is bidirectional, allowing both end nodes of a communication channel to send and receive data simultaneously and/or one at a time on the same frequency range. With a properly configured cable network architecture, such as cable network 12 of communication system 10, full duplex communication can drastically expand available upstream spectrum (e.g., estimated 5 to 10 times upstream capacity increase). Full duplex communication can provide near symmetric downstream and upstream throughput. System capacities (e.g., bandwidth) can improve with full duplex communication. Moreover, full duplex communication may be technology-agnostic and/or standards/agnostic.

However, implementing full duplex in existing cable networks meet with certain challenges. For example, a large transmitted signal coupled back to the receiver due to reflection (e.g., self-interference from the transmit pathway into the receive pathway within one and same transceiver) at any of the network components, including CMTS 14, cable modems 16, transceivers 18, amplifiers 19 and taps and splitters 23 can kill the received signal at the receiver. Moreover, upstream transmit signal from one of cable modems 16 may leak into the downstream pathway of another of cable modems 16, causing interference. Unlike self-interference, such inter-CM interference cannot be removed with mere echo cancellation techniques because the upstream transmit signal is unknown in the downstream pathway.

Embodiments of communication system 10 can resolve such issues by enabling high fidelity (e.g., high linearity), high power-efficient amplifiers through digital pre-distortion and machine learning and incorporating echo cancellation mechanisms appropriately. According to embodiments of communication system 10, input signal 40 is pre-distorted to compensate for any nonlinearity of amplifier 30. The pre-distortion is applied to the digitized RF signal after a modulator (not shown) in the transmitter (e.g., if DPD module 20 is located at a transmitter, for example, in transceiver 18) or amplifier 30.

Snap shots (e.g., samples) of input signal 40 and output signal 50 of DPD module 20 are taken. Predistortion coefficients namely DPD coef 42 are computed (e.g., determined, calculated, etc.) by comparing the snap shots. The comparison is performed such that channel effects (e.g., fraction delay, time offset of the input and output signals, reflection, frequency dependent channel response, leakage of upstream signal, inherent noise (e.g., thermal/phase noise) of DPD module 20, etc.) are compensated for. The computation is performed iteratively. As used herein, "channel effects" can include fraction delay, time offset between input and output signals, reflection, frequency dependent channel response, signal leakage, thermal noise, phase noise and any other parameter that distorts signals traversing the amplifier module according to a predominantly linear mathematical relationship (e.g., nonlinear effects on the signals being negligent compared to the linear effect).

When new coefficients are obtained in an iteration starting out with old coefficients (e.g., coefficients computed in the preceding iteration), a coefficient 'update direction' is determined (e.g., computed) from the old and new coefficients. A step (e.g., small step in terms of magnitude) in the 'update direction' is taken to obtain trial coefficients. The trial coefficients are used as DPD coef 42 to predistort input signal 40. The signal quality (e.g., modulation error ratio (MER), adjacent channel power ratio (ACPR)) of output signal 48 is computed. If the signal quality improved, the new coefficients are used; otherwise, the new coefficients are discarded in favor of the old coefficients. The iterative steps are repeated until a preconfigured signal quality is obtained.

In various embodiments, DPD actuator 26 comprises a DSP, field-programmable gate array (FPGA) integrated circuit, application specific integrated circuit (ASIC), or other suitable integrated circuit configured to receive input signals, process (e.g., modify, adjust, etc.) them using DPD coef 42 and generate output signal 44 in the digital domain. In some embodiments, DPD coef finder 36 may comprise an ASIC, DSP or other processor configured to perform the operations as described herein.

Figure 3:
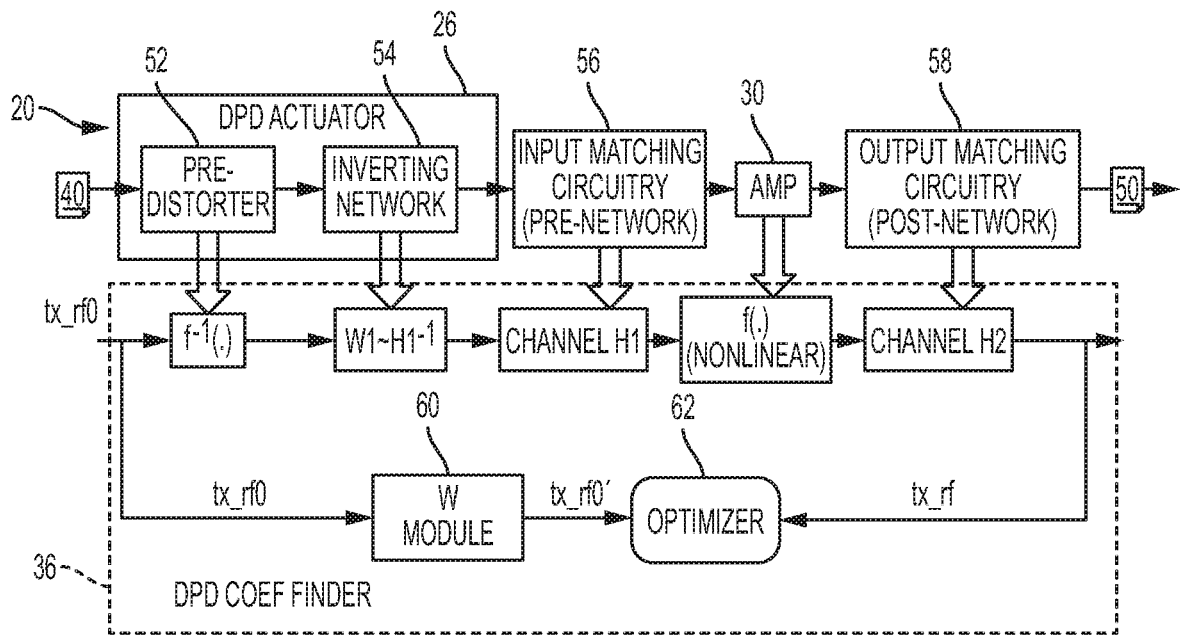
FIG. 3 is a simplified block diagram illustrating yet other example details of embodiments of the communication system.

Turning to FIG. 3, FIG. 3 is a simplified diagram illustrating example details of a logical arrangement of DPD module 20 according to an embodiment of communication system 10. DPD actuator 26 comprises a pre-distorter 52 and an inverting network 54. The electrical and RF circuitry preceding amplifier 30 and subsequent to DPD actuator 26 (e.g., circuit comprises DAC 28 and any other appropriate component, such as noise inducers, resistive elements, etc.) may be represented by an input-matching circuitry 56 also referred to as "pre-network," which introduces channel effects. Likewise, the electrical and RF circuitry following amplifier 30 on reference path 32 (e.g., circuit may include RF downconverter, ADC 34, etc.) may be represented by an output matching circuitry 56 also referred to as "post-network."

Amplifier 30 may be represented logically (e.g., mathematically, algorithmically) by a nonlinear function f(.). Pre-network 56 may be represented logically by a channel function H1. In various examples, H1 may represent undesirable interferences and disturbances that corrupts input signal 40 before it reaches amplifier 30. H1 can also represent multiple frequencies comprised in input signal 40. In a general sense, H1 may represent a channel emulator. For example, H1 may represent a channel impulse response (CIR) such as:

$$H1(t) = \sum_{i=0}^{M-1} \alpha_i(t)\delta(t - \tau_i)$$

where $\alpha_i(t)$ is the ith complex channel tap coefficient of input signal 40, $\delta$ is the Dirac delta function representing the impulse signal, $\tau_i$ is the delay of the ith tap, and M is the number of resolvable taps. Each tap in the CIR shows delay, attenuation and phase shift introduced to the signal, and may be emulated using appropriate filters, attenuators, delay elements, etc. Post-network 58 may be represented logically by another channel function H2.

In a general sense, DPD mechanisms are used to find amplifier non-linearity f(.) and invert it in the digital domain so as to make the overall block of DPD actuator + amplifier appear more linear. In various embodiments, the DPD mechanism includes sampling the RF signal (digitized to input signal 40) before and after amplification, and, based on the sample differences, extracting amplifier nonlinearity. The RF signal sampled after amplification not only bears the characteristics of the amplifier nonlinearity, but also includes effects of the pre-network CIR H1 and the post network CIR H2. In some use-cases (e.g., based on the data carried in the signal), the effects of the H1 and H2 on the RF signal may be more dominant than the amplifier nonlinearity. For example, the nonlinearity may distort the RF signal and generate noise that is 45 dBc below a desired signal level, but discontinuities in HFC may create reflections with level 30 dBc, or 15 dB above the noise generated by non-linearity.

Further, the frequency dependent input and output impedance matching circuitries may create 'memory effect' in the output signal, that is, the output at the current (e.g., present) time depends on the inputs of previous times. Moreover, any fractional delay occurring between input and output will make the output signal appear totally different from the input signal. Such effects (e.g., reflection, frequency dependent channel, fractional delay) may be suitably modeled as H1 and H2. In various embodiments, H1 and H2 may comprise linear functions, represented by corresponding linear networks. In other words, H1 and H2 together may logically represent all linear distortions on input signal 40 within DPD module 20.

Pre-distorter 52 represents a logical circuit that modifies input signal 40 according to an inverse function of f(.), namely $f^{-1}(.)$. Inverting network 54 comprises an inverting function W1 that approximates an inverse function of CIR H1 (e.g., W1~H1$^{-1}$, where H$^{-1}$*H1=U, unitary matrix). Input signal 40 may be represented as tx_rf0, and output signal 50 out of post-network 58 may be represented as tx_rf. In other words, tx_rf0 subjected to functions $f^{-1}(.)$, W1, H1, f(.) and H2 is transformed into tx_rf:

tx_rf=H2*f(.)*H1*tx_rf0, where * stands for convolution operation.

Synchronizing tx_rf and tx_rf0 (in time) can be indicative of the nonlinear function f(.). Synchronizing procedure according to an example embodiment may comprise finding a vector w that minimizes the following objective function:

$$w*tx\_rf0-tx\_rf$$

As used herein, the term "vector" refers to a list of data items, for example, a one-dimensional array, and can represent one-dimensional time or frequency dependent signals (or functions). In other words, w represents a virtual network that behaves substantially identically to a combination of H1 and H2, such that any differences between w*tx_rf0 and tx_rf represents the nonlinearity f(.) of amplifier 30. The virtual network is represented as a W module 60, which comprises convoluting vector w, representing mathematical approximations H1 and H2. tx_rf0 convoluted with w may be represented as tx_rf0', which may be compared with tx_rf in an optimizer 62. The optimizing process can comprise any suitable mathematical method known in the art, for example, linear regression, or root least square (RLS). For optimization purposes, the reference function is tx_rf0, the observation function is tx_rf, and w is the coefficient sought. Optimizer 62 provides substantially accurate values for convoluting vector w, which can, in turn, be used to determine $f^{-1}(.)$.

In various embodiments, the amplifier nonlinearity is characterized with the input-output signal level relationship in 2×1024 vector format:

$$X=[x0,x1,\ldots,x1023]; Y=[y0,y1,\ldots,y1023];$$

where xi, i=0, 1, . . . , 1023 are the input signal level (real numbers), and yi, i=0, 1, . . . , 1023 are the output signal level (real numbers). xi, i=0, 1, . . . , 1023 are evenly spaced. At each input level xi (i=0, 1, 2, ..., 1023), multiple output level observations due to noise are averaged to give the corresponding yi (i=0, 1, 2, ..., 1023). $f^{-1}(.)$ is obtained by inverting the nonlinearity curve:

$$f^1(.)=[X, X-\lambda*(Y-X)]$$

where $\lambda$ is a damping factor, $0<\lambda<=1$. $f^{-1}(.)$ maps data points to inverts f(.), point by point instantaneously, without any 'memory' effect.

Figure 4:
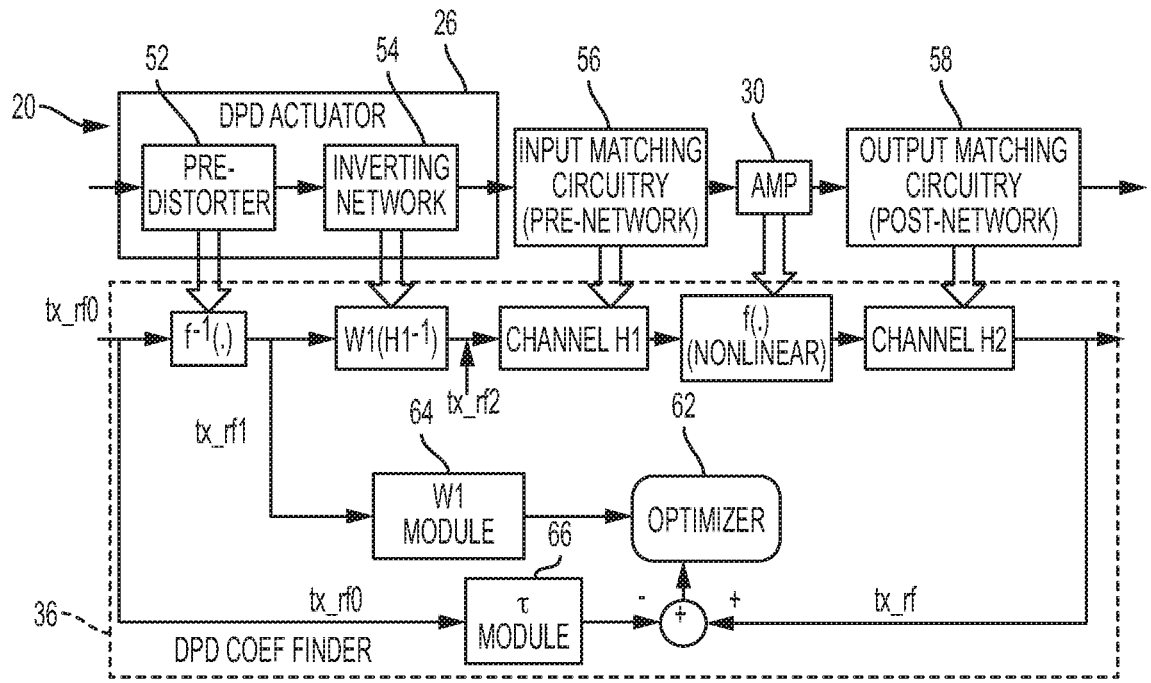
FIG. 4 is a simplified block diagram illustrating yet other example details of embodiments of the communication system.

Turning to FIG. 4, FIG. 4 is a simplified diagram illustrating example details of a logical arrangement of DPD module 20 according to an embodiment of communication system 10. Pre-network H1 exhibits certain (e.g., non-zero) frequency dependent response, and causes signal spread over time, i.e., signal at the current time depends on signals in previous times. To apply DPD coef 42 effectively, the effect of the pre-network is removed in various embodiments as follows. tx_rf0 subjected to inverting function $f^{-1}(.)$ may be represented as tx_rf1. Using tx_rf1 as the reference and tx_rf-tx_rf0 (delayed) as the observation, a function W1 is optimized using the following objective function:

$$\min \| tx\_rf - tx\_rf0(t-\tau) \|$$

which can also be written as:

$$\min \| f(tx\_rf1 * W1 * H1) * H2 - tx\_rf0(t-\tau) \|$$

where * stands for convolution function, and f(.) represents amplifier non-linearity of amplifier 30. W1 module 64 convolutes and computes tx_rf1 with W1, and computes tx_rf1*W1. Time delay module 66 introduces a time delay $\tau$ according to the following relation: $\tau=\text{ceiling}(\tau 0)+1\sim 3$, where $\tau 0$ is a delay estimation between tx_rf1*W1 and tx_rf. (Note that ceiling function or ceiling(x), also represented as $\lceil x \rceil$ is the smallest integer greater than or equal to x). Optimizer 62 performs optimization appropriately to minimize differences between tx_rf and tx_rf0(t-$\tau$). The result of the process is vector W1, which approximates $H1^{-1}$.

Figure 5:
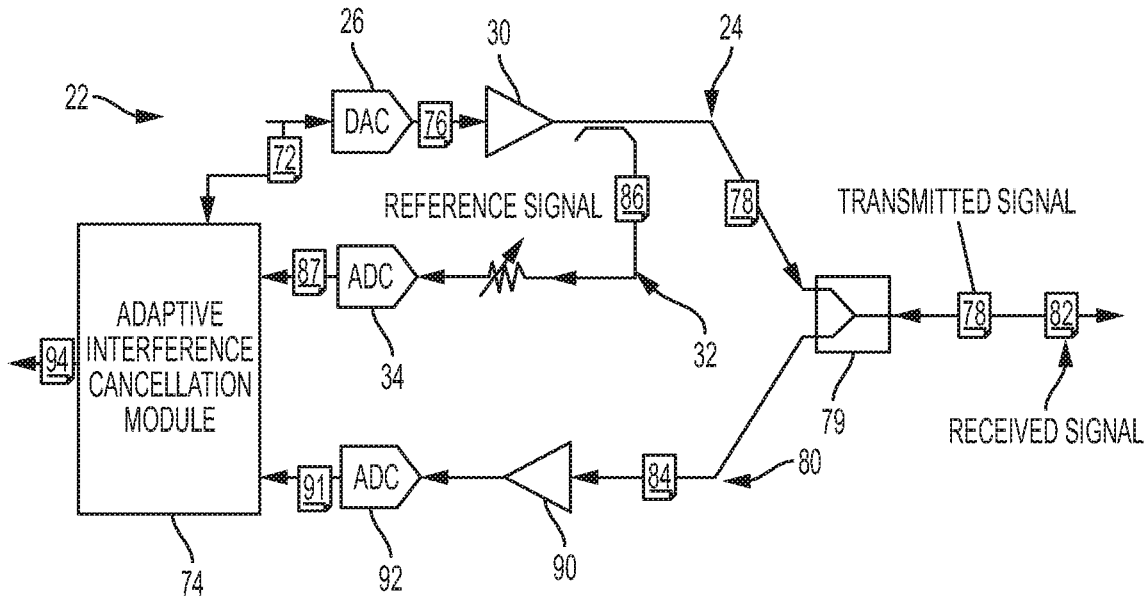
FIG. 5 is a simplified block diagram illustrating yet other example details of embodiments of the communication system.

Turning to FIG. 5, FIG. 5 is a simplified block diagram illustrating example details of EC module 22 according to an embodiment of communication system 10. On TX path 24, an OFDM signal baseband generator (not shown) generates a baseband reference signal. In an example embodiment, the baseband reference signal comprises a pseudo-random binary sequence (PRBS) signal with a bandwidth of 12.8 MHz, at a clock rate of 20.48 MHzm with OFDM characteristics including subcarrier spacing of 20 kHz, Fast Fourier size of 1024, and a cyclic prefix up to 1.2207 μs (e.g., 25 time-domain samples). In some embodiments, an external interface with an external OFDM signal generator inputs data to be transmitted in the OFDM baseband reference signal. In some embodiments, the baseband signal with data is up sampled by 20 times to 409.6 MHz, for example, to tune to any desired location in a frequency spectrum from 0 MHz to 150 MHz. The 20 time oversamples are split into 3 steps of 5 times, 2 times and 2 times, respectively, with half band harmonics suppression filtering. A quadrature modulator modulates the oversampled signal to generate a digital baseband OFDM signal 72 (for the sake of brevity, digital baseband (BB) OFDM signal may alternatively be referred to as simply BB signal).

BB signal 72 is provided as a reference signal to an AIC module 74. AIC module 74 comprises a block of instructions implementing an appropriate AIC algorithm. BB signal 72 is further converted to RF signal 76 at DAC 26; amplifier 30 amplifies RF signal 76 into amplified RF signal 78. A two-way combiner-splitter 79 transmits amplified RF signal 78 out as a transmitted signal.

Amplified RF signal 78 may be reflected back on to a receive (RX) path 80 in one or more frequencies that overlap with those of received RF signal 82 received on RX path 80 due to full duplex operation. Thus, the reflected signal may interfere with received signal 82 on RX path 80, generating RF signal 84. In various embodiments, it may be desirable to extract received signal 82 without the interferences from the reflected signal.

A portion of received RF signal 82 may be reflected back on TX path 24, interfering with RF signal 78 generating an RF reference signal 86, which is provided to AIC module 74 on reference path 32 as a digital signal 87 after conversion by ADC 34. On RX path 80, RF signal 84 is amplified by a low-noise amplifier (LNA) 90, converted to a digital signal 91 by an ADC 92 and fed to AIC module 74. Note that LNA 90 amplifies low-power signals on RX path 80 without significantly degrading their signal-to-noise ratio. AIC module 74 reduces interferences in digitized signal 91 from the reflected signal based on BB reference signal 72 and digitized reference signal 87, producing desired output signal 94. In various embodiments, AIC module 74 calculates various EC coefficients and delay parameters in the digital domain using signals 72 and 87, and applies them to signal 91 to obtain output signal 94.

In a general sense, a channel impulse response can be measured from BB reference signal 72 and RF reference signal 86. In various embodiments, AIC module 74 executes the AIC algorithm and cancels out interferences in RF signal 84 from transmitted RF signal 78. In some embodiments, prior to interference cancellation, RF signal 84 may be processed through a quadrature demodulator and subjected to decimation, for example, at which the received 409.6 intermediate frequency (IF) signal is decimated by 20 times to a 20.48 MHz base band signal. In various embodiments, interference-canceled output signal 94 is subjected to demodulation and fed to an OFDM signal receptor (not shown). The interference-canceled signal may be sent to the external computing device and post-processed with appropriate post processing algorithms.

Figure 6:
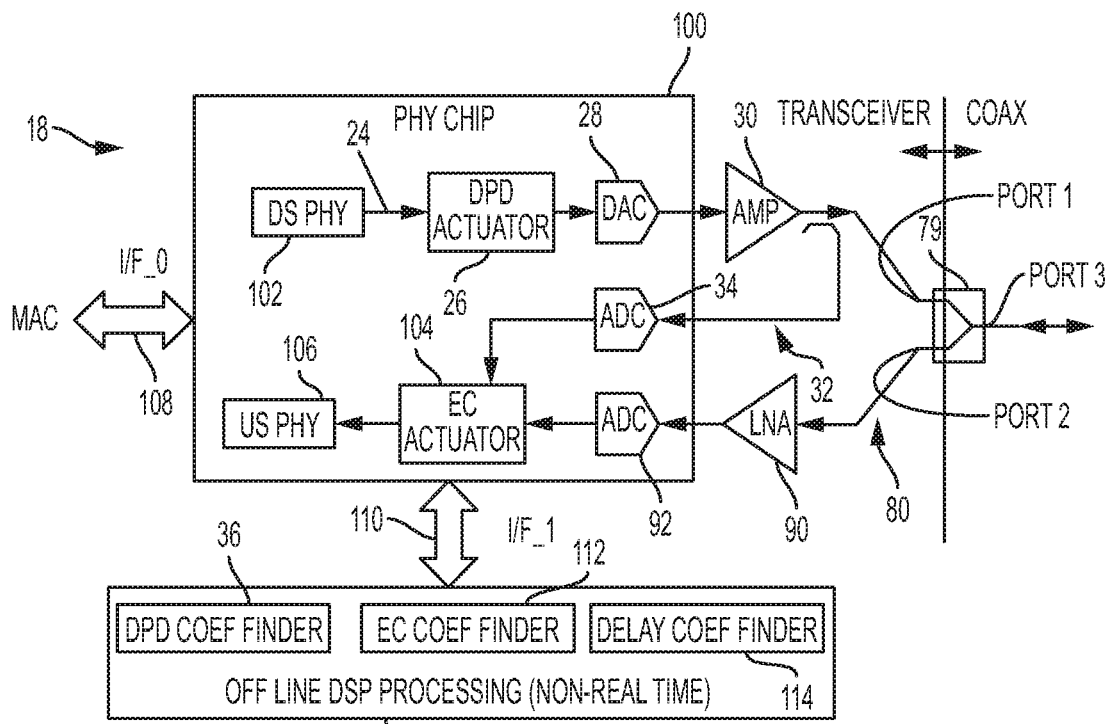
FIG. 6 is a simplified block diagram illustrating yet other example details of embodiments of the communication system.

Turning to FIG. 6, FIG. 6 is a simplified diagram illustrating example details of a hardware implementation of DPD module 20 and EC module 22 in a single component (e.g., transceiver 18) according to an embodiment of communication system 10. Note that a similar hardware architecture may be employed in amplifiers 19 within the broad scope of the embodiments.

A PHY chip 100 may include a downstream (DS) PHY module 102 (comprising electrical circuitry for facilitating DS signal transmission and reception at the PHY layer), DPD actuator 26, DAC 28, ADC 34, ADC 92, an Echo Cancellation (EC) actuator 104 (comprising electrical circuitry for implementing echo cancellation on signals in real-time), and an upstream (US) PHY module 106 (comprising electrical circuitry for facilitating US signal transmission and reception at the PHY layer). In various embodiments, DPD actuator 26 predistorts signals on TX path 24, compensating for distortions introduced by amplifier 30 in TX path 24. In various embodiments, EC actuator 104 reduces interferences in signals on RX path 80, facilitating FDX communication by transceiver 18 in cable network 12.

PHY chip 100 is electrically coupled to amplifier 30 and LNA 90 as indicated in the figure. In a general sense, amplifier 30 differs from LNA 90 in that amplifier 30 comprises a power amplifier, used to increase power of outgoing signals; on the other hand, LNA 90 is used to reduce noise from incoming signals. LNA 90 operates as a front end of the receiver channel on RX path 80, capturing and amplifying very-low-power, low-voltage signals and associated random noise within the bandwidth of interest. In contrast, amplifier 30 takes a relatively strong signal from the preceding circuitry, with relatively high signal-to-noise ratio, and boosts its power.

Reference path 32 is forked from main path 24 after amplifier 30 (e.g., at output of amplifier 30) and connected to ADC 34 over an appropriate electrical pin (not shown) in PHY chip 100. In various embodiments, TX path 24 is connected to a first port (e.g., port 1) of two-way combiner 79; RX path 80 is connected to a second port (e.g., port 2) of combiner 79; and a coaxial cable is connected to a third port (e.g., port 3) of combiner 79. In some embodiments, DAC 28, ADC 34, and ADC 92 may be located in PHY chip 100; in other embodiments, DAC 28, ADC 34, and ADC 92 may be located outside PHY chip 100. In various embodiments, PHY chip 100 may be comprised in a field programmable gate array (FPGA) integrated circuit.

In addition, PHY chip 100 presents two interfaces 108 and 110. Note that PHY chip 100 follows appropriate cable communication protocol specifications (e.g., ECMA, DOCSIS, etc.) and presents interfaces 108 and 110 accordingly. Interface 108 may be used to communicate with MAC components elsewhere in the system. For example, interface 108 may present appropriate ports for communicating data, control messages (e.g., to control operations of PHY chip 100) and management messages (e.g., to access registers in PHY chip 100) between PHY and MAC (e.g., located in CMTS 14) in cable network 12.

Interface 110 may be used to communicate with DPD coef finder 36, EC coef finder 112 and delay coef finder 114 integrated into a DSP 116. In various embodiments, a portion of AIC module 74 may be implemented as EC coef finder 112 and delay coef finder 114. Interface 110 may comprise ports for communicating data between PHY chip 100 and DSP 116. Interface 110 comprises a bi-directional interface for data communication between PHY chip 100 and off line DSP 116. Interface 110 carries data from PHY chip 100 to DSP 116 for coefficient calculations, and carries the updated coefficients back to PHY chip 100. In some embodiments, interface 110 may facilitate direct memory access (DMA), inter-process communication (IPC), and other fast communication mechanisms. PHY chip 100 may include various other components, which are used in full duplex communications, such as modulators, demodulators, ADCs, etc.

Offline DSP 116 may perform various appropriate computations in non-real time (e.g., offline, asynchronously, periodically, etc.). As used herein, the term "real time" refers to synchronicity in time; for example, signals traversing PHY chip 100 are processed (e.g., predistorted; interferences removed; etc.) by DPD actuator 26 and EC actuator 104 synchronously (e.g., without substantial delay); in contrast, DSP 116 computes the DPD coefficients, EC coefficients and the delay parameters asynchronously, independent of timing of the signals traversing PHY chip 100. For example, DPD actuator 26 stores DPD coefficients obtained from DPD coef finder 36 and predistorts signals on TX path 24 in real time, using the stored DPD coefficients. The predistorted signal is amplified by amplifier 30 on TX path 24 and transmitted out of transceiver 18. Similarly, EC actuator stores EC coefficients and delay parameters and processes signals on RX line 80 in real-time using the stored EC coefficients and delay parameters. Periodically (e.g., at preconfigured intervals or at preconfigured network conditions, or at precon-figured environmental conditions), certain signals are forked from TX path 24 including over reference path 32, any analog signals being converted into digital domain by ADC 34, and provided to DSP chip 116 over interface 110. The forked signals are used by DPD coef finder 36 to generate updated DPD coef 42 off-line in non-real time. The forked signals are also used by EC coef finder 112 and delay coef finder 114 to generate updated EC coefficients and delay parameters. In some embodiments, the same forked signals are used by both DPD coef finder 36 and EC coef finder 112 and delay coef finder 114; in other embodiments, separate forked signals are used by DPD coef finder 36 and EC coef finder 112 and delay coef finder 114 to calculate respective coefficients.

"Off-line" as used herein refers to a status of a device (e.g., DPD coef finder 36, EC coef finder 112, delay coef finder 114) that is disconnected from the main signal paths (e.g., TX path 24, RX path 80); in other words, DPD coef finder 36 is not available for immediate use in real-time, on demand by DPD actuator 26; neither are EC coef finder 112 and delay coef finder 114 available for immediate use in real-time, on demand by EC actuator 104. Off-line computation of DPD coefficients, EC coefficients and delay parameters are not time-constrained to signals on the main signal paths; moreover, off-line computation may be performed to selected signals only (e.g., samples). In contrast, real-time processing of input signals (e.g., transmitted signals and received signals) is performed constantly, to all signals as they traverse through the main signal paths.

Moreover, DPD actuator 26 does not immediately control DPD coef finder 36 and read DPD coef 42 continuously; rather, DPD coef finder 36 may compute DPD coef 42 at pre-determined intervals (or events) and feed them to DPD actuator 26. Thus, computation of DPD coef 42 takes place independently of DPD actuator 26. Similarly, EC actuator 104 does not immediately control EC coef finder 112 or delay coef finder 114 and read the computed parameters continuously; rather, EC coef finder 112 may compute EC coefficients at pre-determined intervals (or events) and feed them to EC actuator 104.

Figure 7:
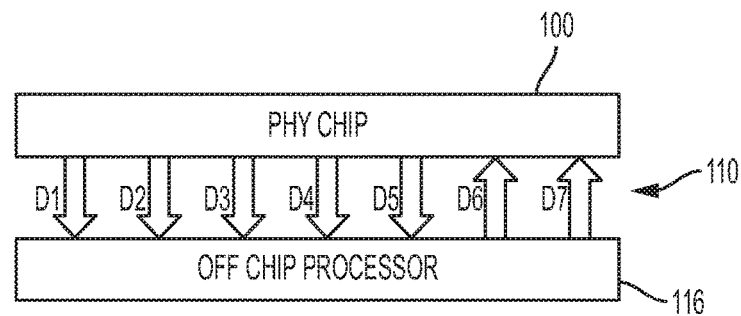
FIG. 7 is a simplified block diagram illustrating yet other example details of embodiments of the communication system.

Turning to FIG. 7, FIG. 7 is a simplified diagram illustrating example details of interface 110 according to an embodiment of communication system 10. Interface 110 includes seven channels, out of which five channels provide data from PHY chip 100 to DSP 116 (also referred to as Off-Chip Processor), and two channels provide data from DSP 116 to PHY chip 100. Data channels D1, D2, D3, D4 and D5 provide digitized forked signals for coefficient calculation; data channels D6 and D7 return computed coefficients to PHY chip 100.

Figure 8:
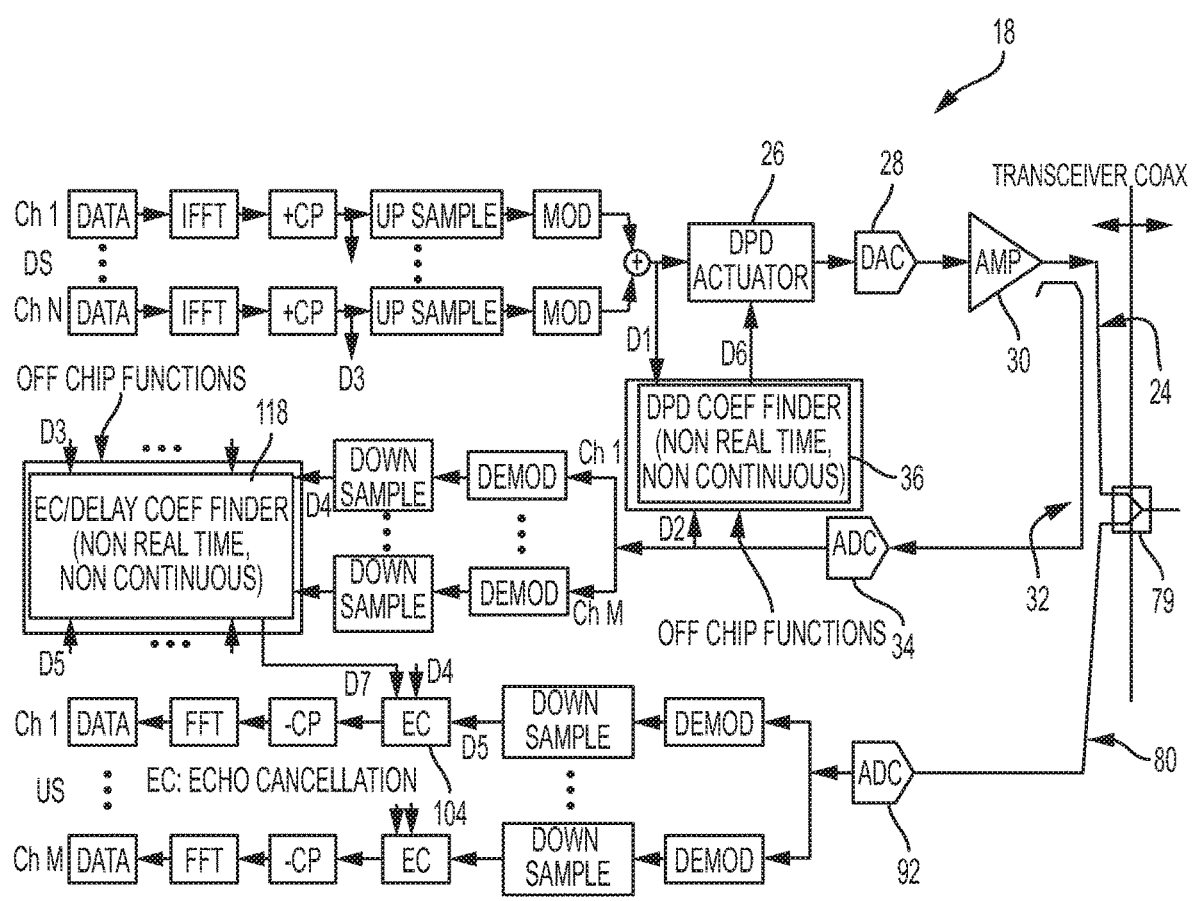
FIG. 8 is a simplified block diagram illustrating yet other example details of embodiments of the communication system.

Turning to FIG. 8, FIG. 8 is a simplified diagram illustrating example details of a hardware implementation of DPD module 20 and EC module 22 in a single component (e.g., transceiver 18) according to an embodiment of communication system 10. Data over channels D1 and D2 comprise input and output data (e.g., signals 40 and 50 in FIG. 2) obtained before and after amplifier 30 on TX path 24. Signals on a plurality of channels (e.g., channels 1 through N) are subjected to inverse fast fourier transform (IFFT), cyclic prefix addition (+CP), up sampling, and modulation. After modulation, modulated digital signal 40 is forked over channel D1 as real numbers to DPD coef finder 36. Modulated digital signal 40 is converted to analog domain by DAC 28, amplified by amplifier 30, forked into reference path 32 and converted into digital domain by ADC 34. Amplified digital signal 50 is provided as real numbers over channel D2 to DPD coef finder 36.

In various embodiments, data over channels D1 and D2 have the same sampling clock rate. Although the data need not necessarily be synchronized in time (although they can be), a substantial portion (e.g., >90%) is overlapped in time to enable accurate DPD computation. The data over D1 and D2 may be in xx format with N (N>12) bit resolution, and data sizes greater than 1 Mb with continuous samples in time. In various embodiments, data over D1 and D2 are provided when a trigger is received by PHY chip 100. For slow tracking, the trigger may occur infrequently.

Data over D3 comprises a base band portion of the signals traversing TX path 24. For example, BB signal 72 (see FIG. 5) may be provided over channel D3. Each channel 1 to N may provide a separate base band signal over D3 to EC/delay coef finder 118. Note that for ease of illustration, EC coef finder 112 and delay coef finder 114 are collapsed into one logical block, namely, EC/delay coef finder 118. In hardware implementation, each of EC coef finder 112 and delay coef finder 114 may operate separately from each other.

Signals on a plurality of channels (e.g., channels 1 through N) are subjected to inverse fast Fourier transform (IFFT) and cyclic prefix addition (+CP), and then forked over channel D3 as complex numbers to EC/delay coef finder 118. In a general sense, BB signal 72 over TX path 24 comprise complex numbers (e.g., (I, Q) clocked at 204.8 Msps). Data over D3 is sent when a trigger received by PHY chip 100. The trigger may occur infrequently for slow tracking. In an example embodiment, data over D3 is in xx format with 16-bit resolution. Data size may be greater than 1 Mb, with continuous samples in time. In general, data over D2 does not necessarily have to be synchronized with data over D4 and D5, although a substantial portion (e.g., >90%) of the data over these channels overlap in time.

Data over channels D4 and D5 comprise the BB portion of each channel, taken, respectively, from reference path 32 and RX path 80. For example, digitized reference signal 87 and digitized RF signal 91 (see FIG. 5) may be provided over channels D4 and D5, respectively. In some embodiments, whereas data over D3 comprise BB signals on DS channels, data over D4 and D5 comprise BB signals on US channels. Data over D4 and D5 are complex numbers (e.g., (I, Q) clocked at 102.4 Msps). Data over D4 and D5 are sent when a trigger is received by PHY chip 100. The trigger may occur infrequently for slow tracking. In an example embodiment, data over D4 and D5 are in xx format with 16-bit resolution. Data size may be greater than 1 Mb, with continuous samples in time. Data over D4 and D5 are provided as inputs to EC/delay coef finder 118. Note that data over D5 may be provided to both EC/delay coef finder 118 and EC actuator 104. Whereas EC/delay coef finder 118 uses the data over D5 on a periodic basis, EC actuator 104 processes the data in real time. Moreover, in many embodiments, EC/delay coef finder 118 is implemented in off-line DSP 116, whereas EC actuator 104 is implemented on-line in PHY chip 100.

Data over D6 comprises DPD coefficients and channel coefficients (e.g., data 42 in FIG. 2) provided to DPD actuator 26 from DPD coef finder 36. The DPD coefficients are provided in 2×1024 format: [x0, x1, . . . , x1023;y0, y1, . . . , y1023], where xi, i=0, 1, . . . , 1023, are evenly spaced input signal level (real numbers), and yi, i=0, 1, . . . , 1024, are the pre-distorted input signal level (real numbers), representing the non-linearity of amplifier 30. DPD actuator 26 implements DPD algorithm, comprising a two-points linear interpolation (LUT) algorithm in an example embodiment, after modulation in RF domain. The 1024 points cover a peak-to-peak signal swing. Channel coefficients, representing channel effects on TX line 24, are provided in 1×16 format: [$F_0$, $F_1$, . . . , $F_{15}$]. The channel coefficients may be used on signals traversing TX path 24 according to standard (e.g., known, ordinary, usual, etc.) finite impulse response (FIR) techniques. For example, the output signal from DPD actuator 28 represents a weighted sum of the most recent input signals (e.g., the input signal as subjected to 16 taps (e.g., τ apart, where τ comprises a finite delay, and representing the 16 channel coefficients) and weighted respectively using the channel coefficients $F_0$, $F_1$, $F_{15}$).

Data over channel D7 comprises the EC coefficients and delay parameters of each channel in RX path 80 (e.g., representing the US channel in some embodiments) provided to EC actuator 104 from EC/delay coef finder 118. EC is performed by EC actuator 104 on a per channel basis after channelization into channels 1 through M on RX path 80. The EC coefficients are complex numbers, and delay parameters are in samples clocked at 102.4 Msps in some embodiments. Note that the demodulation and down sampling operations in reference path 32 are identical as those in the RX path 80.

Figure 9:
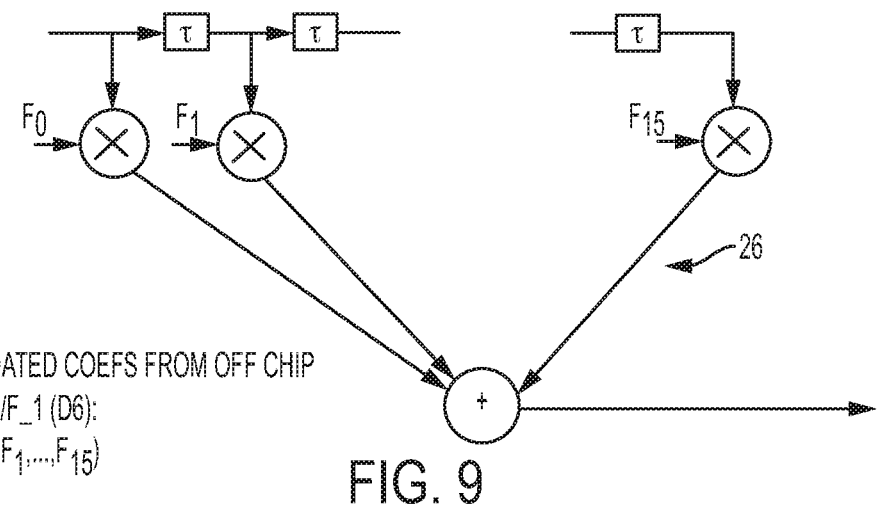
FIG. 9 is a simplified block diagram illustrating yet other example details of embodiments of the communication system.

Turning to FIG. 9, FIG. 9 is a simplified block diagram illustrating channel compensation in DPD actuator 26 according to an embodiment of communication system 10. DPD actuator 26 receives updated channel coefficients over channel D6: ($F_0$, $F_1$, . . . , $F_{15}$). Input signal subjected to LUT in DPD actuator 26 using DPD coefficients [x0, x1, . . . , x1023; y0, y1, . . . , y1023] is convoluted using channel coefficients [$F_0$, $F_1$, . . . $F_{15}$] to obtain pre-distorted signal (e.g., signal 44 in FIG. 2) from DPD actuator 26.

Figure 10:
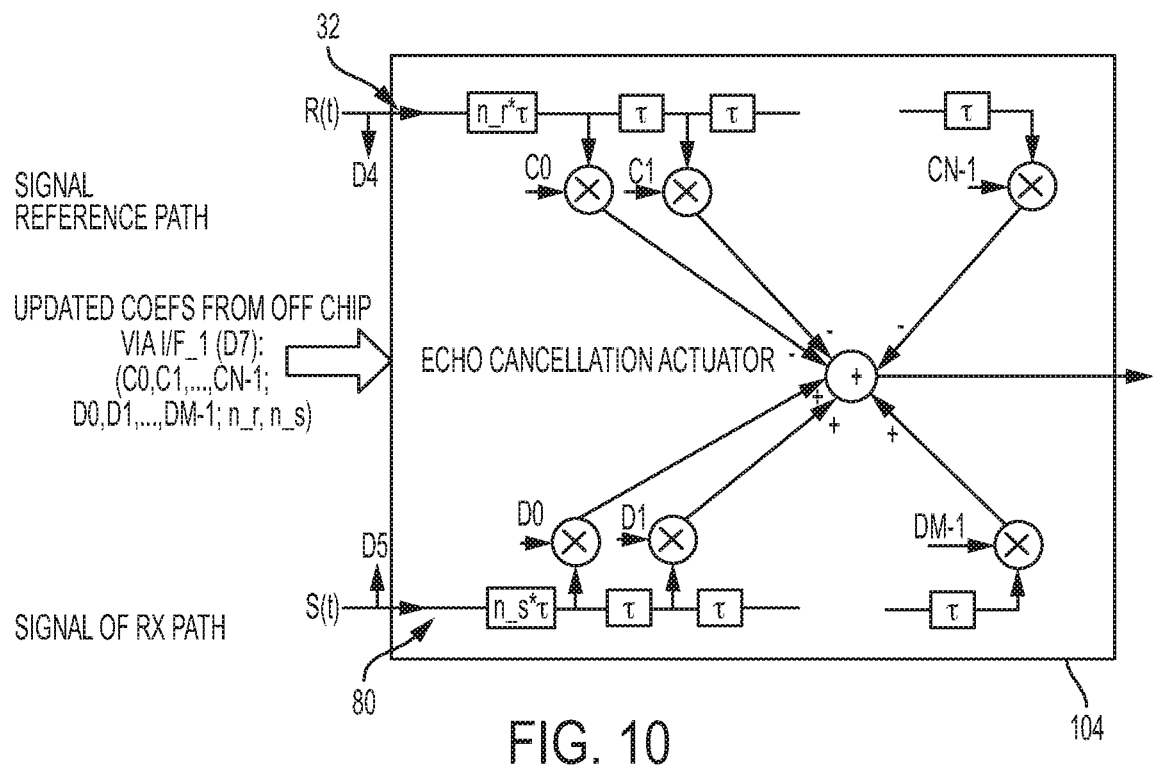
FIG. 10 is a simplified block diagram illustrating yet other example details of embodiments of the communication system.

Turning to FIG. 10, FIG. 10 is a simplified block diagram illustrating example details of EC actuator 104 according to an embodiment of communication system 10. In an example embodiment, EC is implemented as two branch adaptive filters in EC actuator 104. Data over D7 is provided externally to EC actuator 104 of each channel as (C0, C1, . . . , CN-1; D0, D1, . . . , DM-1; n_r, n_s). C0, C1, CN-1 represent channel coefficients on reference path 32; D0, D1, . . . DM-1 represent channel coefficients on RX path 80; N represents the number of channels (or taps) on TX path 24 (e.g., DS channels); M represents the number of channels (or taps) on RX path 80 (e.g., US channels); n_r and n_s represent initial delay coefficients for FIR calculations on TX path 24 and RX path 80, respectively. In an example embodiment, N=512, M=64, n_r>=0, n_s>=0. In various embodiments, n_r, n_s depend on how well the reference and receiver signals are aligned inside PHY chip 100.

In various embodiments, input signal S(t), received over channel D5 at EC actuator 104, and the reference signal R(t) received over channel D4 may be subjected to respective convolution functions using EC coefficients and delay parameters (C0, C1, . . . , CN-1; D0, D1, . . . , DM-1; n_r, n_s) provided to EC actuator 104 over channel D7. For example, each convolution function may result in a corresponding signal comprising weighted time-shifted samples of the respective signals. The convoluted reference signal is cancelled (e.g., subtracted) from the convoluted input signal to obtain the desired output signal without interferences. These operations may be repeated at each subcarrier frequency (e.g., channel).

Figure 11:
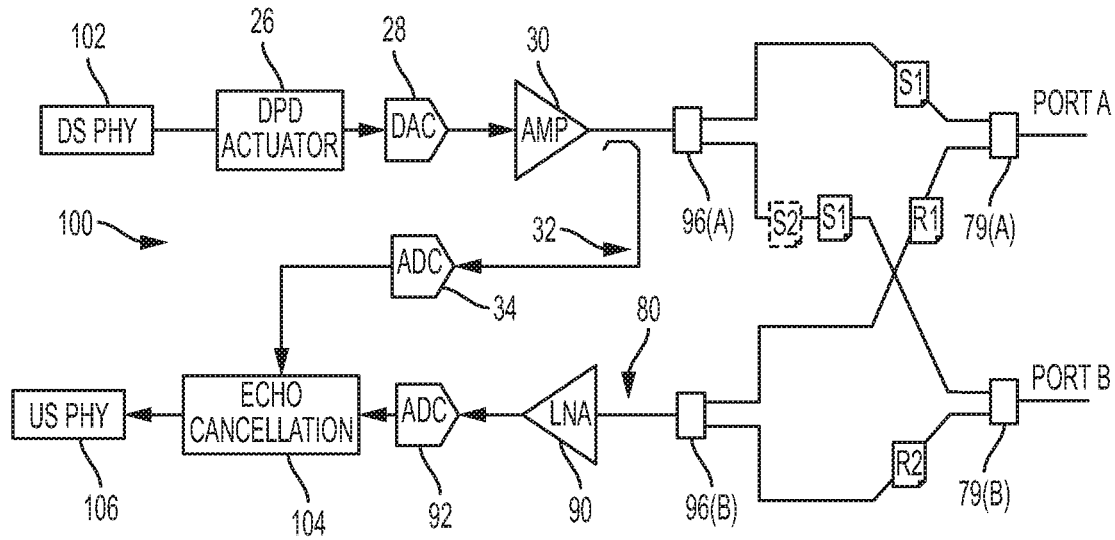
FIG. 11 is a simplified block diagram illustrating yet other example details of embodiments of the communication system.

Turning to FIG. 11, FIG. 11 is a simplified diagram illustrating example details of transceiver 18 having multiple ports according to an embodiment of communication system 10. Example PHY chip 100 may be used in a transceiver with two ports, Port A and Port B, with respective two-way combiners 79(A) and 79(B). Signals over Port A and Port B are split in the RF domain (as opposed to the digital domain).

Due to the DPD and AIC algorithms used in the various embodiments, the TX data and RX data are mapped to each other one-to-one. In some embodiments, Port A and Port B transmit identical data, but may receive different signals. For example, signal S1 may be sent out through Port A and Port B; signals R1 and R2 may be received over Port A and Port B respectively. In other embodiments, Port A and Port B transmit and receive different signals. For example, signals S1 and S2 may be sent out through respective ports Port A and Port B; signals R1 and R2 may be received over Port A and Port B respectively. Additional two-way combiners 96(A) and 96(B) may be used to combine and/or split the US and DS signals in the RF domain. In such embodiments, the hardware circuitry for DPD and EC functionalities can be reused for Ports A and B.

Figure 12:
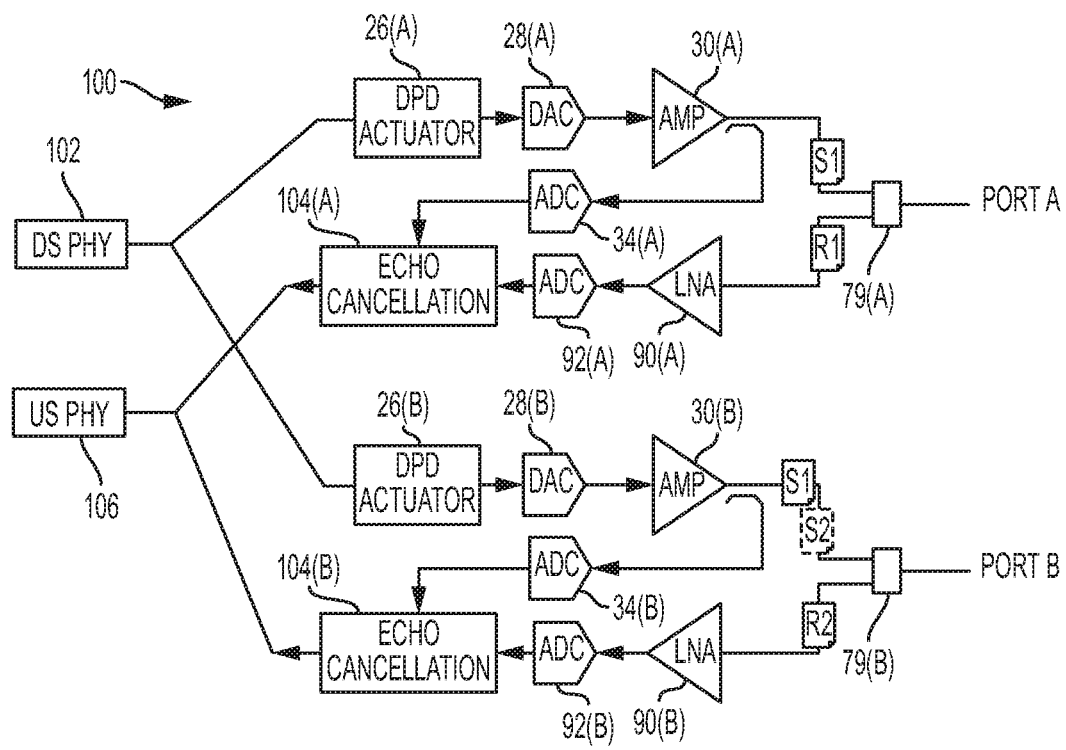
FIG. 12 is a simplified block diagram illustrating yet other example details of embodiments of the communication system.

Turning to FIG. 12, FIG. 12 is a simplified diagram illustrating other example details of transceiver 18 having multiple ports according to an embodiment of communication system 10. Example PHY chip 100 may be used in a transceiver with two ports, Port A and Port B, with respective two-way combiners 79(A) and 79(B). Signals over Port A and Port B are split in the digital domain (as opposed to the RF domain). Due to the DPD and AIC algorithms used in the various embodiments, the TX data and RX data are mapped to each other one-to-one. In some embodiments, Port A and Port B transmit identical data, but may receive different signals. For example, signal S1 may be sent out through Port A and Port B; signals R1 and R2 may be received over Port A and Port B respectively. In other embodiments, Port A and Port B transmit and receive different signals. For example, signals S1 and S2 may be sent out through respective ports Port A and Port B; signals R1 and R2 may be received over Port A and Port B respectively.

Due to the signal split in the digital domain, each of Port A and Port B has dedicated circuitry for performing real-time DPD and EC processing. Thus, Port A has associated dedicated DPD actuator 26(A), DAC 28(A), amplifier 30(A), etc.; Port B has associated dedicated DPD actuator 26(B), DAC 28(B), amplifier 30(B), etc. In other words, hardware for DPD and EC processing cannot be reused by Port A and Port B when signals are split in the digital domain.

Figure 13:
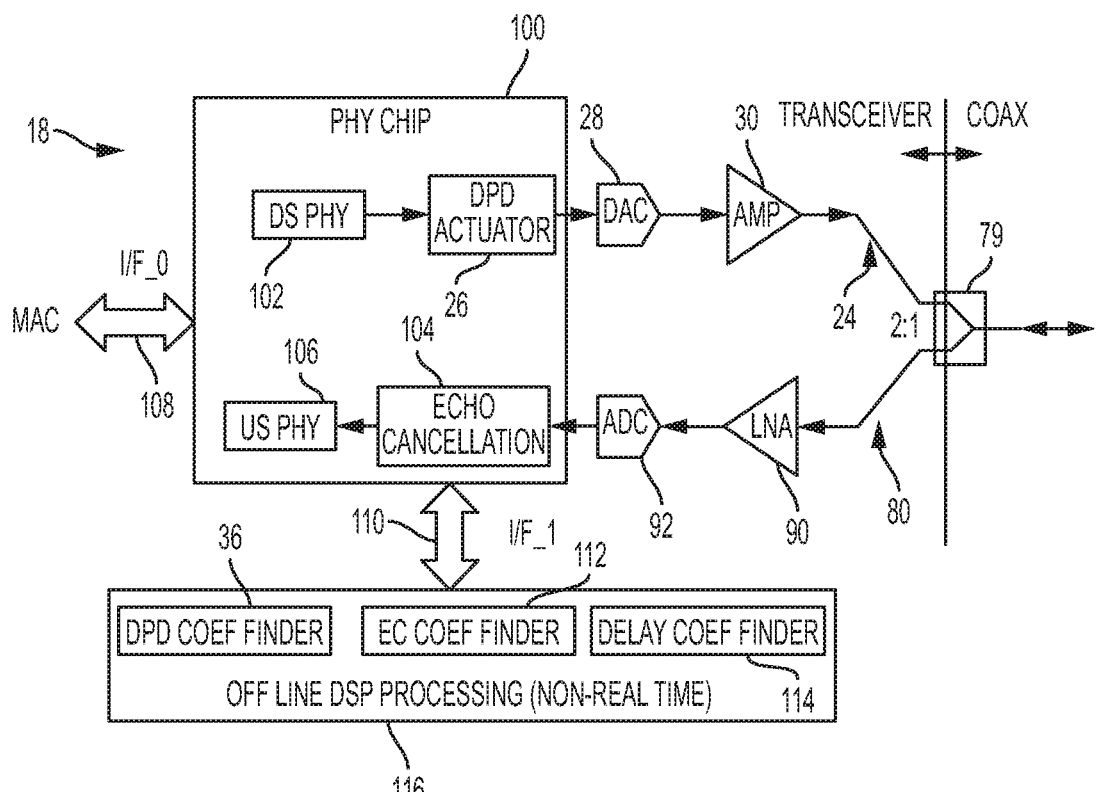
FIG. 13 is a simplified block diagram illustrating yet other example details of embodiments of the communication system.

Turning to FIG. 13, FIG. 13 is a simplified diagram illustrating example details of another hardware implementation of DPD module 20 and EC module 22 in a single component (e.g., transceiver 18) according to an embodiment of communication system 10. According to the embodiment shown in the FIGURE, the RF reference signal for EC coefficient calculations may be determined indirectly, from signals on TX path 24 and RX path 80, without using reference path 32. Note that a similar hardware architecture may be employed in amplifiers 19 within the broad scope of the embodiments. In various embodiments, signals for DPD computations and EC computations may be uncoupled from each other in hardware.

PHY chip 100 may include DS PHY module 102, DPD actuator 26, EC actuator 104, and US PHY module 106. Unlike the embodiment illustrated in FIG. 6, reference path 32 is not connected to PHY chip 100; PHY chip 100 also does not include ADC 34, which may be separately provisioned in DSP 116, or outside either PHY chip 100 and DSP 116. In some embodiments, DAC 28 and ADC 92 may be located in PHY chip 100; in other embodiments, DAC 28 and ADC 92 may be located outside PHY chip 100. PHY chip 100 is electrically coupled to amplifier 30 and LNA 90 as indicated in the figure. In various embodiments, PHY chip 100 may be comprised in a FPGA integrated circuit.

PHY chip 100 presents two data interfaces 108 and 110. Note that PHY chip 100 follows appropriate cable communication protocol specifications (e.g., ECMA, DOCSIS, etc.) and presents interfaces 108 and 110 accordingly. Interface 108 may be used to communicate with MAC components elsewhere in the system. For example, interface 108 may present appropriate ports for communicating data, control messages (e.g., to control operations of PHY chip 100) and management messages (e.g., to access registers in PHY chip 100) between PHY and MAC (e.g., located in CMTS 14) in cable network 12.

Interface 110 may be used to communicate with DPD coef finder 36, EC coef finder 112 and delay coef finder 114 integrated into DSP 116. In various embodiments, a portion of AIC module 74 may be implemented as EC coef finder 112 and delay coef finder 114. Interface 110 may comprise ports for communicating data between PHY chip 100 and DSP 116. Interface 110 comprises a bi-directional interface for data communication between PHY chip 100 and off line DSP 116. Interface 110 carries data from PHY chip 100 to DSP 116 for coefficient calculations, and carries the updated coefficients back to PHY chip 100. In some embodiments, interface 110 may facilitate direct memory access (DMA), inter-process communication (IPC), and other fast communication mechanisms. PHY chip 100 may include various other components, which are used in full duplex communications, such as modulators, demodulators, ADCs, etc.

Offline DSP 116 may perform various appropriate computations in non-real time (e.g., offline, asynchronously, periodically, etc.). For example, DPD actuator 26 stores DPD coefficients obtained from DPD coef finder 36 and predistorts signals on TX path 24 in real time, using the stored DPD coefficients. The predistorted signal is amplified by amplifier 30 on TX path 24 and transmitted out of transceiver 18. Similarly, EC actuator stores EC coefficients and processes signals on RX line 80 in real-time using the stored EC coefficients. Periodically (e.g., at preconfigured intervals or at preconfigured network conditions, or at preconfigured environmental conditions), certain signals are forked from TX path 24 and provided to DSP chip 116 over interface 110 (the forking is not shown in the figure). The forked signals are used by DPD coef finder 36 to generate updated DPD coef 42 off-line in non-real time. The forked signals are also used by EC coef finder 112 and delay coef finder 114 to generate updated EC coefficients.

Figure 14:
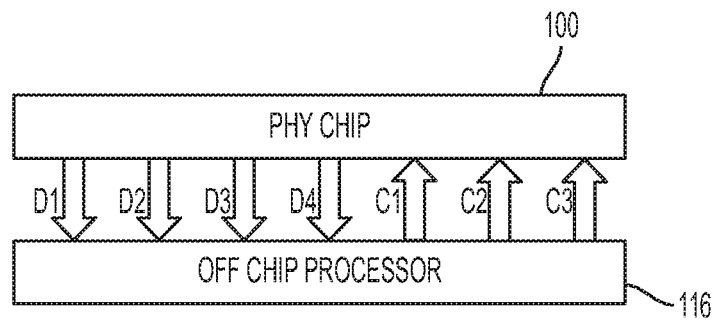
FIG. 14 is a simplified block diagram illustrating yet other example details of embodiments of the communication system.

Turning to FIG. 14, FIG. 14 is a simplified diagram illustrating example details of interface 110 according to an embodiment of communication system 10. Interface 110 includes seven channels, out of which four channels provide data from PHY chip 100 to DSP 116, and three channels provide data from DSP 116 to PHY chip 100. Data channels D1, D2, D3 and D4 provide digitized forked signals for coefficient calculation; data channels C1, C2 and C3 return computed coefficients to PHY chip 100.

Figure 15:
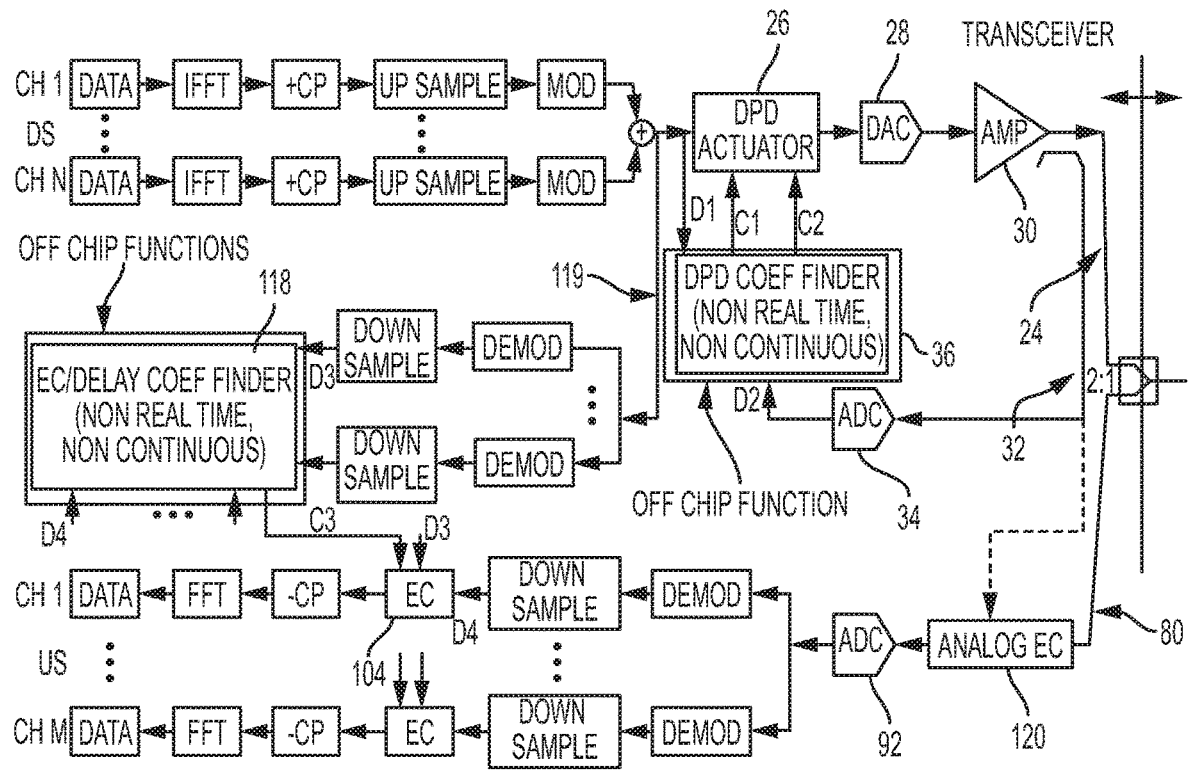
FIG. 15 is a simplified block diagram illustrating yet other example details of embodiments of the communication system.

Turning to FIG. 15, FIG. 15 is a simplified diagram illustrating example details of a hardware implementation of DPD module 20 and EC module 22 in a single component (e.g., transceiver 18) according to an embodiment of communication system 10. D1 and D2 comprise input and output data (e.g., signals 40 and 50 in FIG. 2) obtained before and after amplifier 30 on TX path 24. Signals on a plurality of channels (e.g., channels 1 through N) are subjected to IFFT, CP addition (+CP), up sampling, and modulation. After modulation, modulated digital signal 40 is forked over channel D1 as real numbers to DPD coef finder 36.

Modulated digital signal 40 is converted to analog domain by DAC 28, (which may be located outside PHY chip 100 in some embodiments) amplified by amplifier 30 (which may be located outside PHY chip 100 in some embodiments), forked into reference path 32 and converted into digital domain by ADC 34. Amplified digital signal 50 is provided as real numbers over channel D2 to DPD coef finder 36. In various embodiments, although the data over channels D1 and D2 need not necessarily be synchronized in time (although they can be), a substantial portion (e.g., >90%) is overlapped in time to enable accurate DPD computation. The data over D1 and D2 may be in xx format with N (N>12) bit resolution, and data sizes greater than 1 Mb with continuous samples in time. In various embodiments, data over D1 and D2 are provided when a trigger is received by PHY chip 100. For slow tracking, the trigger may occur infrequently.

Signals traversing TX path 24 are forked out to a reference path 119 before DPD actuator 26. Note that reference path 119 differs from reference path 32, although they both fork over signals traversing TX path 24. Whereas reference path 119 forks signals prior to amplification at amplifier 30, reference path 32 forks signals after amplification at amplifier 30. The forked signals on reference path 119 are demodulated and downsampled substantially identically as signals traversing RX path 80. The BB portion of signals in reference path 119 are provided over channel D3 to EC/delay coef finder 118. Data over channel D4 comprises the BB portion of US channels, taken from RX path 80. In some embodiments, data over D3 comprises digital signals traversing TX path 24; data over D4 comprises echoes of the same over RX path 80 together with signals traversing RX path 80. Data over D3 and D4 are complex numbers (e.g., (I, Q) clocked at 102.4 Msps). Data over D3 and D4 are sent to EC/delay coef finder 118 when a trigger is received by PHY chip 100. The trigger may occur infrequently for slow tracking. In an example embodiment, data over D3 and D4 are in xx format (e.g., GCP) with 16-bit resolution. Data size may be greater than 1 Mb, with continuous samples in time. Data over D3 and D4 are provided as inputs to EC/delay coef finder 118 and EC actuator 104. Whereas EC/delay coef finder 118 uses the data on a periodic basis, EC actuator 104 processes the data in real time. Moreover, in many embodiments, EC/delay coef finder 118 is implemented in off-line DSP 116, whereas EC actuator 104 is implemented on-line in PHY chip 100.

Data over C1 comprises DPD coefficients (e.g., portion of data 42 in FIG. 2) provided to DPD actuator 26 from DPD coef finder 36. The DPD coefficients are provided in 2×1024 format: [x0, x1, . . . , x1023;y0, y1, . . . , y1023], where xi, i=0, 1, . . . , 1023, are evenly spaced input signal level (real numbers), and yi, i=0, 1, . . . , 1024, are the pre-distorted input signal level (real numbers). DPD actuator 26 implements DPD algorithm, comprising a two-points linear interpolation (LUT) algorithm in an example embodiment, after modulation in RF domain. The 1024 points cover a peak-to-peak signal swing. Channel coefficients are provided over channel C2 in 1×16 format: [$C2_0$, $C2_1$, . . . , m], where 0≤m≤16. The channel coefficients, representing the channel effects on TX line 24 may be used on signals traversing TX path 24 according to standard (e.g., known, ordinary, usual, etc.) FIR techniques. For example, the pre-distorted signal generated by LUT using DPD coefficients obtained over C1 may be subjected to FIR (e.g., convoluted) using coefficients obtained over C2 and compared with the original transmitted signal delayed by m times (0≤m≤16).

Data over channel C3 comprises the EC coefficients and delay parameters (e.g., (C0, C1, . . . CN-1, n_s); N=400) of each channel in RX path 80 (e.g., representing the US channel in some embodiments) provided to EC actuator 104 from EC/delay coef finder 118. EC is performed by EC actuator 104 on a per channel basis after channelization into channels 1 through M on RX path 80. The EC coefficients are complex numbers, and delay parameters are in samples (e.g., clocked at 102.4 Msps in some embodiments). Note that the demodulation and down sampling operations in reference path 32 are identical as those in the RX path 80.

In some embodiments, an analog EC module 120 may be provisioned in transceiver 18, either inside or outside PHY chip 100 according to convenience on RX path 80. An assumption of analog echo cancellation is that DACs have a better dynamic range than ADCs. For example, currently available DACs have one to two bit better dynamic range than ADCs, resulting in six to 10 dB better performance. The AIC algorithm used for analog EC is similar to that used in digital EC, except that the reference TX signal in analog EC adds noise (e.g., any noise 6 dB below a predetermined threshold typically adds 1 dB to overall noise). Given a particular DAC clock rate (e.g., of greater than 3 Gbps), analog EC can only cancel out the first one or two dominant interference components (e.g., 10 dB or so interference suppression). Note that any known analog echo cancellation circuitry may be implemented in Analog EC module 120. For example, Analog EC module 120 may include a DSP, a DAC and LNA 90, which may operate together to remove influence of certain TX signals from RX path 80.

Figure 16:
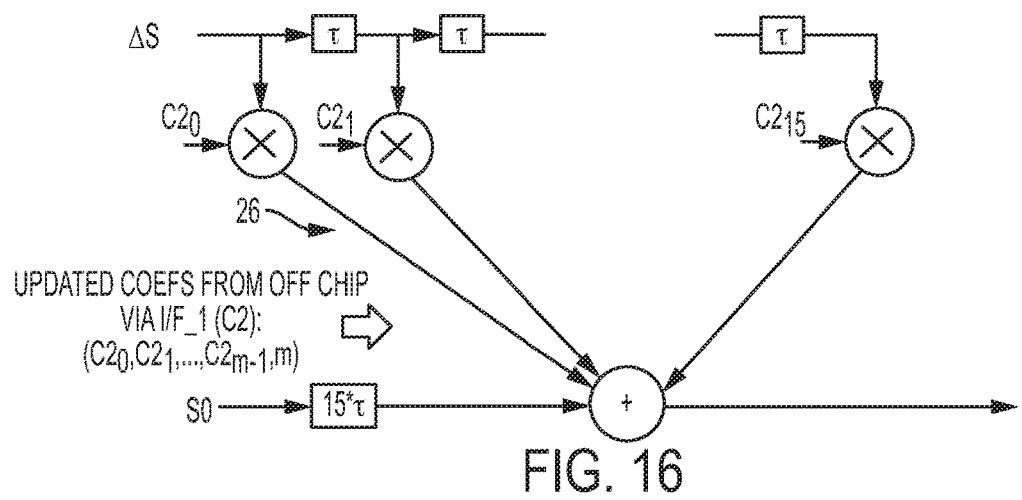
FIG. 16 is a simplified block diagram illustrating yet other example details of embodiments of the communication system.

Turning to FIG. 16, FIG. 16 is a simplified block diagram illustrating channel compensation in DPD actuator 26 according to an embodiment of communication system 10. DPD actuator 26 receives updated channel coefficients over channel C2: ($C2_0$, $C2_1$, . . . , $C2_{15}$). S0 is the original transmitted signal, ΔS is the delta (pre-distortion) signal generated by pre-distortion (e.g., using LUT techniques) in DPD actuator 26 using DPD coefficients obtained over channel C1: ΔS=LUT(S0)−S0.

Figure 17A:
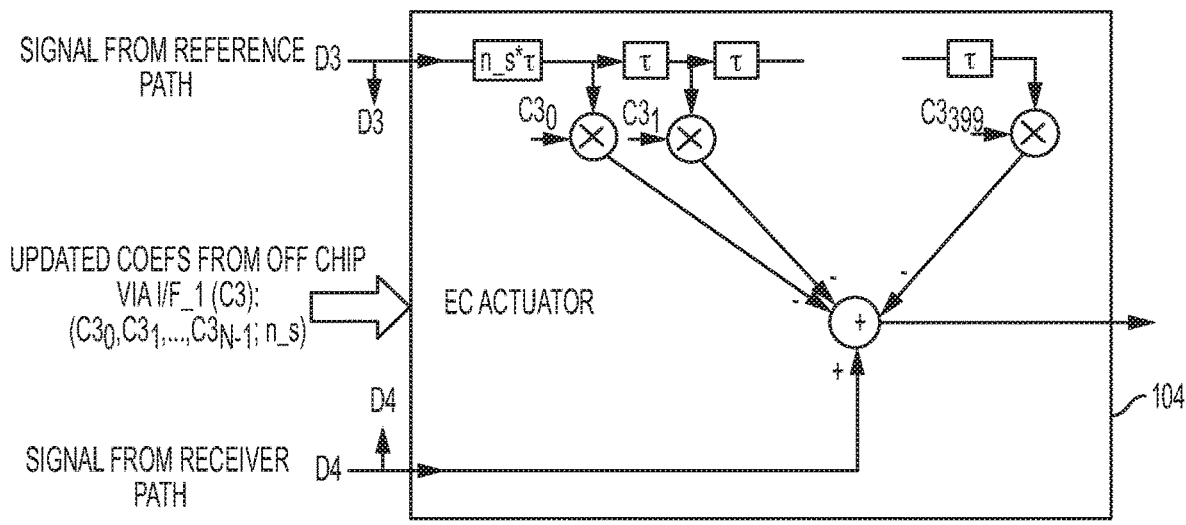
FIG. 17A is a simplified block diagram illustrating yet other example details of embodiments of the communication system.
Figure 17B:
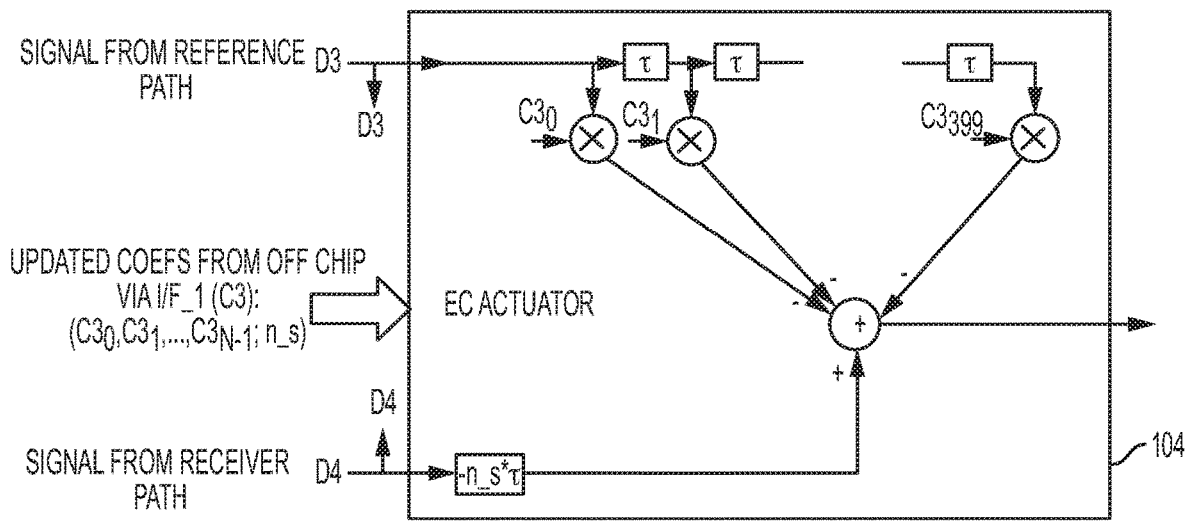
FIG. 17B is a simplified block diagram illustrating yet other example details of embodiments of the communication system.

Turning to FIGS. 17A and 17B, FIGS. 17A and 17B are simplified block diagrams illustrating echo cancellation operations of EC actuator 104. EC is performed on a per US channel basis after channelization. The demodulation and down sampling operations in reference path 32 are identical as those in receiver path 80. EC is implemented in the form of adaptive filters, with delays and filter coefficients provided externally through channel C3 from DSP 116. In FIG. 17A, delay n_s>0, whereas in FIG. 17B, n_s<0.

In various embodiments, where n_s>0, the reference signal received over channel D3 may be subjected to a convolution function using EC coefficients and delay parameters (C30, C31, . . . , C3N-1; n_s) provided to EC actuator 104 over channel C3. For example, the convolution function may result in a corresponding signal comprising weighted time-shifted samples of the reference signal. The convoluted reference signal is cancelled (e.g., subtracted) from the input signal received over channel D4 to obtain the desired output signal without interferences. These operations may be repeated at each subcarrier frequency (e.g., channel).

In various embodiments, where n_s<0, the input signal received over channel D4may be subjected to a convolution function using EC coefficients and delay parameters (C30, C31, . . . , C3N-1; n_s) provided to EC actuator 104 over channel C3. For example, the convolution function may result in a corresponding signal comprising weighted time-shifted samples of the input signal. The convoluted input signal is cancelled (e.g., subtracted) from the reference signal received over channel D3 to obtain the desired output signal without interferences. These operations may be repeated at each subcarrier frequency (e.g., channel).

Figure 18:
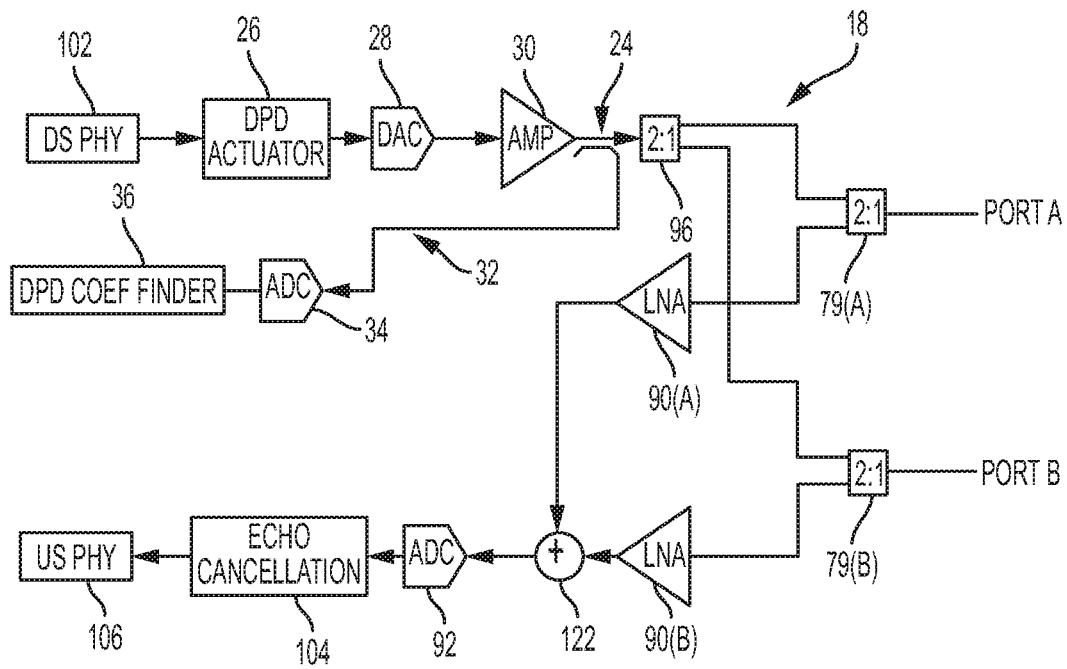
FIG. 18 is a simplified block diagram illustrating yet other example details of embodiments of the communication system.

Turning to FIG. 18, FIG. 18 is a simplified block diagram illustrating example details of transceiver 18 having multiple ports according to an embodiment of communication system 10. Example PHY chip 100 may be used in a transceiver with two ports, Port A and Port B, with respective two-way combiners 79(A) and 79(B). Signals over Port A and Port B are split in the RF domain (as opposed to the digital domain). There is one-to-one mapping between TX digital input and output for closed-loop DPD. On the other hand, RF sampling ADC can be shared among multiple ports. According to an example embodiment, transmitted signals sent out over TX path 24 are split in the RF domain at combiner/splitter 96 into Port A and Port B. Received signals from Port A and Port B are added at adder 122 in RX path 80. Thus, with minimal hardware change, a majority of the hardware usable for single port transceivers can be reused for multi-port transceivers.

Figure 19:
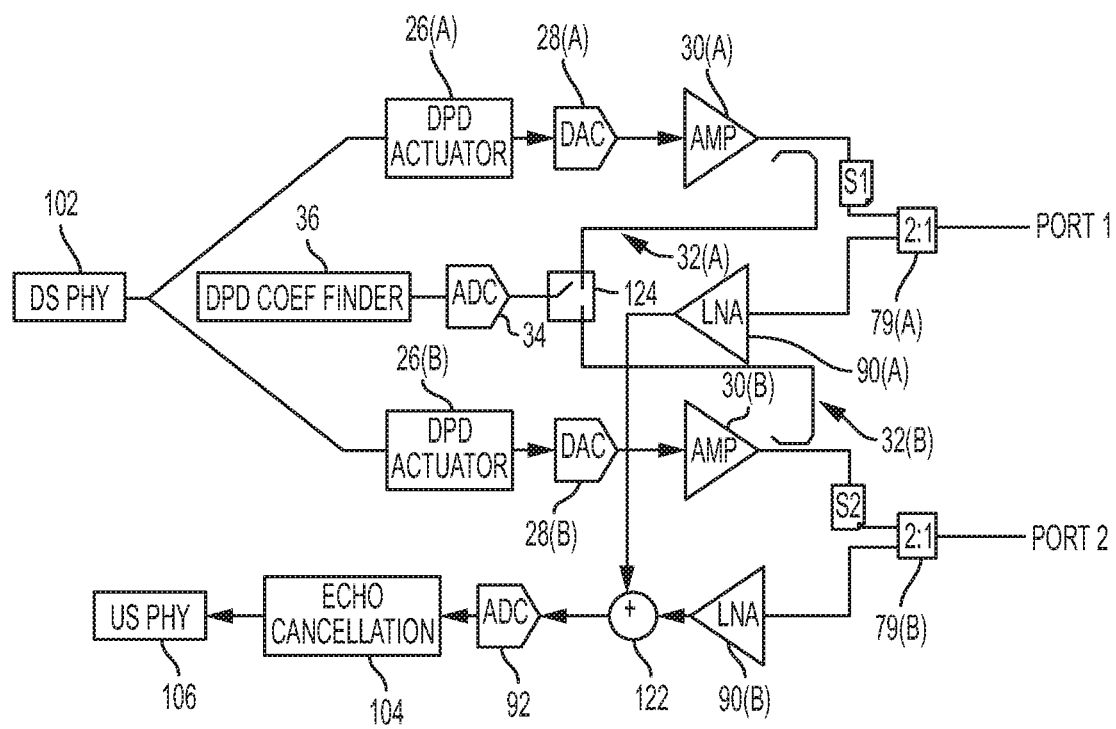
FIG. 19 is a simplified block diagram illustrating yet other example details of embodiments of the communication system.

Turning to FIG. 19, FIG. 19 is a simplified diagram illustrating other example details of transceiver 18 having multiple ports according to an embodiment of communication system 10. Example PHY chip 100 may be used in a transceiver with two ports, Port A and Port B, with respective two-way combiners 79(A) and 79(B). Signals over Port A and Port B are split in the digital domain (as opposed to the RF domain). Due to the DPD and AIC algorithms used in the various embodiments, the TX data and RX data are mapped to each other one-to-one.

Despite the signal split in the digital domain, certain hardware components of single port transceivers may be reused in TX signal path 24 of multi-port transceivers, whereas substantially all hardware components in RX path 80 may be reused. For example, DPD coefficient calculation for signals S1 and S2 may be accomplished by a switch 124, which switches between reference paths 32(A) and 32(B), respectively for corresponding DPD coefficient calculations.

Figure 20:
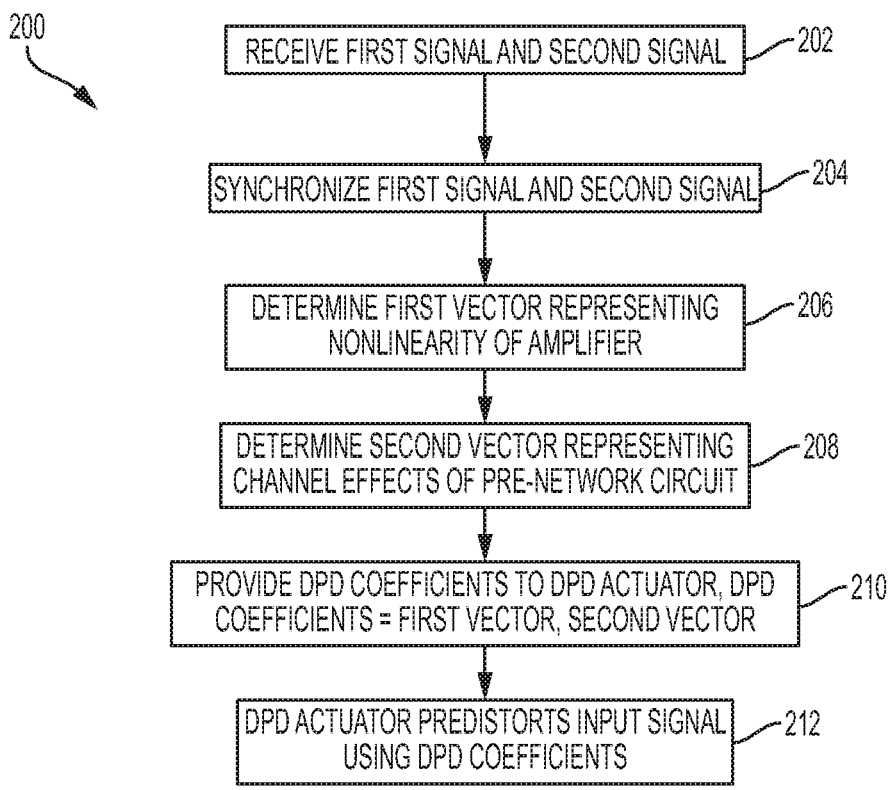
FIG. 20 is a simplified flow diagram illustrating example operations that may be associated with embodiments of the communication system.
Figure 21:
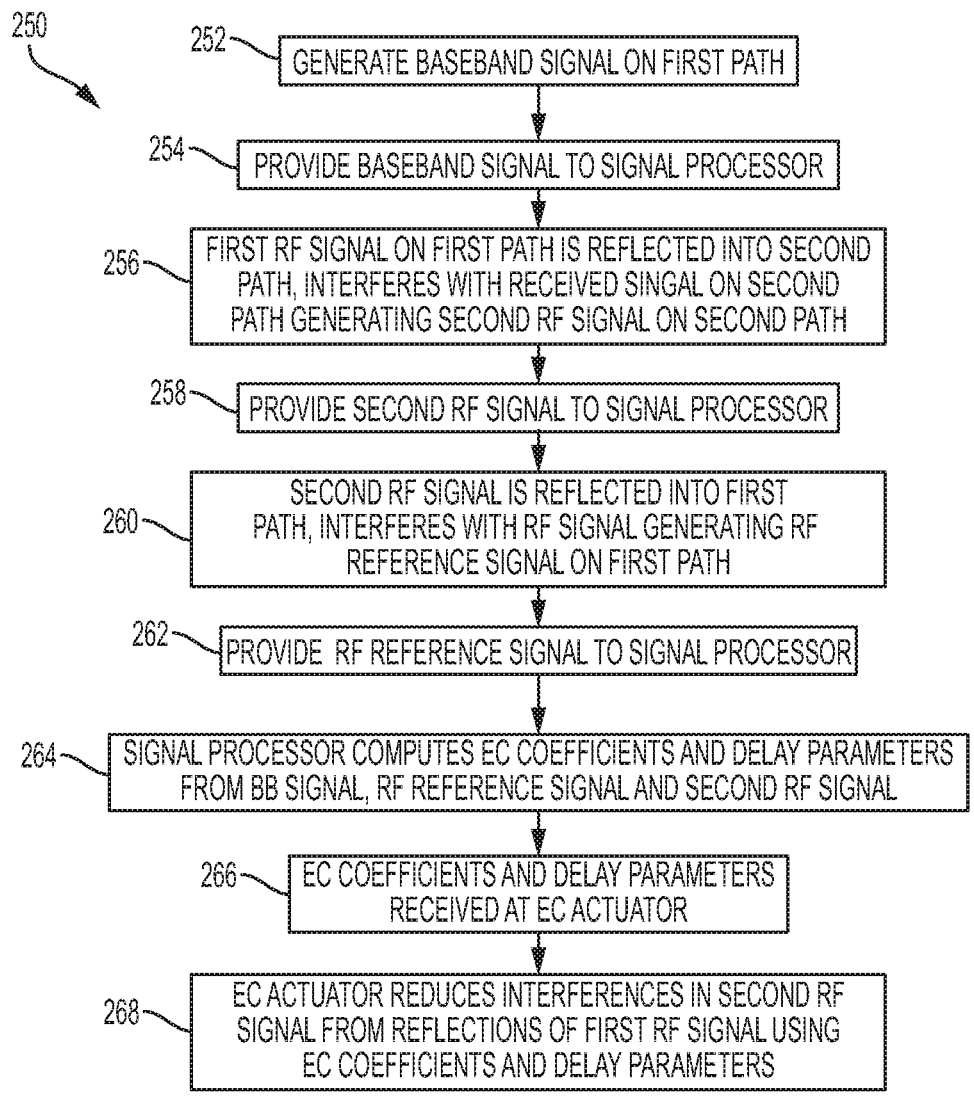
FIG. 21 is a simplified flow diagram illustrating other example operations that may be associated with embodiments of the communication system.

Turning to FIG. 20, FIG. 20 is a simplified flow diagram illustrating example operations 200 that may be associated with an embodiment of communication system 10. At 202, DPD coef finder 36 receives a first signal (tx_rf0) and a second signal (tx_rf), the first signal being transformed into the second signal after being passed in sequence through pre-network circuit 56, amplifier 30, and post-network circuit 58, wherein pre-network circuit 56 and post-network circuit 58 introduces distortions due to channel effects (H1 and H2, respectively) and amplifier 30 introduces distortions due to nonlinearity. At 204, DPD coef finder 36 synchronizes the first signal with the second signal to remove the channel effects H1 and H2 of corresponding pre-network circuit 56 and post network circuit 58. At 206, DPD coef finder 36 determines a first vector ($f^{-1}(.)$) representing an inverse of the nonlinearity of amplifier 30. At 208, DPD coef finder 36 determines a second vector (W1) representing an inverse of the channel effects H1 of pre-network circuit 56.

At 210, DPD coef finder 36 provides DPD coef 42 to DPD actuator 26, DPD coef 42 comprising the first vector and the second vector. In some embodiments (e.g., FIG. 8), the first vector and second vector are provided over the same channel D6; in other embodiments (e.g., FIG. 15), the first vector and second vector are provided over different channels, namely C1 and C2. DPD actuator 26 predistorts input signals to DPD module 20 using DPD coef 42, such that corresponding output signals from DPD module 20 retains linearity relative to the input signals.

Turning to FIG. 18, FIG. 18 is a simplified flow diagram illustrating example operations 200 that may be associated with DPD module 20 according to embodiments of communication system 10. At 202, DPD coef finder 36 receives a first signal (e.g., signal 40 in FIG. 2; tx_rf0 in FIG. 3 and FIG. 4) and a second signal (e.g., signal 50 in FIG. 2; tx_rf in FIG. 3 and FIG. 4), the first signal being transformed into the second signal after being passed in sequence through pre-network circuit 56, amplifier 30, and post-network circuit 58, wherein pre-network circuit 56 and post-network circuit 58 introduces distortions due to channel effects (H1 and H2, respectively) and amplifier 30 introduces distortions due to nonlinearity (see, e.g., FIG. 3 and FIG. 4). In various embodiments (e.g., FIG. 8 and FIG. 15), the first signal is received over channel D1 and the second signal is received over channel D2 from PHY chip 100.

At 204, DPD coef finder 36 synchronizes the first signal with the second signal to remove the channel effects H1 and H2 of corresponding pre-network circuit 56 and post network circuit 58. At 206, DPD coef finder 36 determines a first vector (e.g., $f^{-1}(.)$ of FIG. 3 and FIG. 4) representing an inverse of the nonlinearity of amplifier 30. At 208, DPD coef finder 36 determines a second vector (e.g., W1 of FIG. 3 and FIG. 4) representing an inverse of the channel effects H1 of pre-network circuit 56. At 210, DPD coef finder 36 provides DPD coef 42 to DPD actuator 26, DPD coef 42 comprising the first vector and the second vector. At 212, DPD actuator 26 predistorts input signal 40 using DPD coef 42, such that corresponding output signal 48 from DPD module 20 retains linearity relative to input signal 40.

Turning to FIG. 19, FIG. 19 is a simplified flow diagram illustrating example operations 200 that may be associated with EC module 22 according to embodiments of communication system 10. At 252, BB signal 72 is generated on a first path, such as TX path 24, of an integrated circuit (e.g., PHY chip 100) in a network element, such as transceiver 18. As used herein, the term "network element" encompasses a transceiver (e.g., transceiver 18), an amplifier (e.g., amplifier 19), a cable modem (e.g., cable modem 16) or other network component of cable network 12 that supports full duplex communication and includes at least one non-linear amplifier, and through which signals flow in an upstream direction and downstream direction in overlapping frequency ranges. At 254, BB signal 72 is provided to an off-line digital processor (e.g., DSP 116) over a suitable interface, such as channel D3. In some embodiments (see, e.g., FIG. 5), BB signal 72 may be provided after a data signal is subjected to IFFT and CP addition; in other embodiments (see, e.g., FIG. 15), BB signal 72 may be provided after demodulation and down sampling.

At 256, a first RF signal 78 on TX path 24 is reflected into a second path, such as RX path 80, and interferes with received signal 82 on RX path 80, generating a second RF signal 84 on RX path 80. At 258, second RF signal 84 is provided, as input to DSP 116 (e.g., after suitably amplifying and converting to digital domain) over a suitable interface, such as channel D5(e.g., FIG. 5), or D4(e.g., FIG. 15). At 260, second RF signal 84 is reflected into TX path 24, and interferes with first RF signal 78, generating RF reference signal 86 on TX path 24. At 262, RF reference signal 86 is bifurcated into reference path 32 and provided to DSP 116 (e.g., after suitably amplifying and converting to digital domain) over a suitable interface, such as channel D4(e.g., FIG. 8). In some embodiments (e.g., FIG. 15), RF reference signal 86 is integrated with other signals (e.g., BB signal 72) and provided over channel D3.

At 264, DSP 116 computes EC coefficients and delay parameters from BB signal 72, RF reference signal 86 and second RF signal 84. For example, in some embodiments, (see, e.g., FIG. 8), DSP 116 computes EC coefficients and delay parameters from data provided over channels D3, D4 and D5; in other embodiments (see, e.g., FIG. 15), DSP 116 computes EC coefficients and delay parameters from data provided over channels D3 and D4. At 266, EC actuator 104 receives the calculated EC coefficients and delay parameters over an appropriate interface, such as channel D7 (e.g., FIG. 8) or C3 (e.g., FIG. 15). At 268, EC actuator 104 reduces interferences in second RF signal 84 in real-time from reflections of first RF signal 78 using the EC coefficients and delay parameters.

Figure 22:
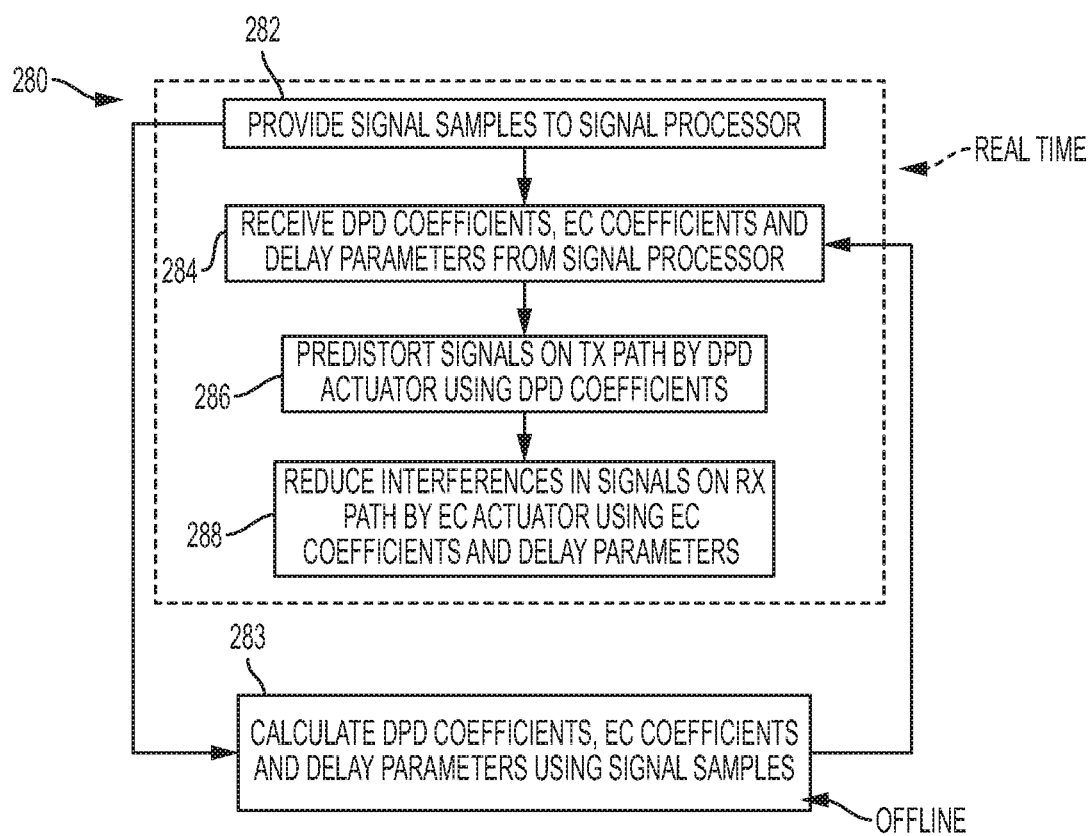
FIG. 22 is a simplified flow diagram illustrating yet other example operations that may be associated with embodiments of the communication system.

Turning to FIG. 22, FIG. 22 is a simplified flow diagram illustrating example operations 280 that may be associated with embodiments of communication system 10. At 282, signal samples are provided by PHY chip 100 to signal processor, DSP 116. The signal samples may be provided upon a trigger (e.g., timer), or at specified intervals (e.g., periodically), or network conditions (e.g., traffic congestion, etc.). At 283, DSP 116 calculates DPD coefficients, EC coefficients and delay parameters from the signal samples. At 284, DPD coefficients, EC coefficients and delay parameters are received at PHY chip 100 from DSP 116. At 286, DPD actuator 26 in PHY chip 100 predistorts signals on TX path 24 using the DPD coefficients. At 288, EC actuator 104 reduces interferences in signals on RX path 80 using the EC coefficients and the delay parameters. Note that except for operation 283 performed at DSP 116, the operations are performed in real time at PHY chip 100.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, DPD module 20, EC module 22, and transceiver 18. In some embodiments, one or more of these features may be implemented in hardware, provided external to these elements, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, DPD module 20, EC module 22, and transceiver 18 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element comprised in DPD actuator 26, DPD coef finder 36, EC coef finder 112, delay coef finder 114, EC actuator 104) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor comprised in DPD actuator 26, DPD coef finder 36) could transform an element or an article (e.g., data, or electrical signals) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An apparatus, comprising:
a first path for first signals being transmitted out of the apparatus;
a second path for second signals being received into the apparatus;
a digital pre-distortion (DPD) actuator located on the first path;
an amplifier located on the first path;
an echo cancellation (EC) actuator located on the second path; and
a data interface comprising a plurality of channels connecting the apparatus to a signal processor, wherein DPD coefficients, EC coefficients and delay parameters are provided over the data interface from the signal processor to the apparatus, wherein the DPD actuator predistorts the first signals on the first path using the DPD coefficients compensating for distortions introduced by the amplifier, wherein the EC actuator reduces interferences in the second signals on the second path using the EC coefficients and the delay parameters, facilitating full duplex (FDX) communication by the apparatus in a cable network, and wherein the signal processor samples the first signals and the second signals traversing the apparatus and computes the DPD coefficients, EC coefficients and delay parameters offline at a predetermined interval.

2. The apparatus of claim 1, wherein the signal processor comprises a DPD coefficient finder, an EC coefficient finder, and a delay coefficient finder, wherein the DPD coefficient finder computes the DPD coefficients, wherein the EC coefficient finder computes the EC coefficients and the delay coefficient finder computes the delay parameters.

3. The apparatus of claim 1, wherein the processing comprises predistorting the first signals on the first path by the DPD actuator, and wherein the processing further comprises reducing interferences in the second signals on the second path by the EC actuator.

4. The apparatus of claim 1, wherein the data interface comprises at least four channels providing data from the apparatus to the signal processor, wherein the at least four channels comprise:
a first channel (D1) providing samples of the first signals into the DPD actuator on the first path,
a second channel (D2) providing samples of the first signals out of the amplifier on the first path,
a third channel (D3) providing a base band (BB) portion of the first signals on the first path, and
a fourth channel (D4) providing a BB portion of the second signals on the second path.

5. The apparatus of claim 4, wherein the data interface further comprises at least three additional channels providing data from the signal processor to the apparatus, wherein the at least three additional channels comprises:
a fifth channel (C1) providing the a first portion of the DPD coefficients computed using the data provided over the first channel and the second channel,
a sixth channel (C2) providing a second portion of the DPD coefficients computed using the data provided over the first channel and the second channel, and
a seventh channel (C3) providing the EC coefficients and the delay parameters using the data provided over the third channel and the fourth channel.

6. The apparatus of claim 1, further comprising an ADC located on a third path between an output of the amplifier and the EC actuator.

7. The apparatus of claim 6, wherein the data interface comprises at least five channels providing data from the apparatus to the signal processor, wherein the at least five channels comprises:
a first channel (D1) providing samples of the first signals into the DPD actuator on the first path,
a second channel (D2) providing samples of the first signals out of the amplifier on the first path,
a third channel (D3) providing a BB portion of the first signals on the first path,
a fourth channel (D4) providing a BB portion of the first signals on the third path, and
a fifth channel (D5) providing a BB portion of the second signals on the second path.

8. The apparatus of claim 7, wherein the data interface further comprises at least two additional channels providing data from the signal processor to the apparatus, wherein the at least two additional channels comprises:
a sixth channel (D6) providing the DPD coefficients computed using the data provided over the first channel and the second channel, and
a seventh channel (D7) providing the EC coefficients and the delay parameters using the data provided over the third channel, the fourth channel and the fifth channel.

9. The apparatus of claim 1, further comprising: a combiner connected to the first path on a first port of the combiner, to the second path on a second port of the combiner and to a coaxial cable on a third port of the combiner, the coaxial cable connecting the apparatus to the cable network, wherein the first signals on the first path are transmitted out of the apparatus over the coaxial cable, and wherein the second signals on the second path are received into the apparatus over the coaxial cable.

10. The apparatus of claim 1, further comprising:
a digital-to-analog converter (DAC) located between the DPD actuator and the amplifier on the first path, wherein the DAC converts the predistorted signals from the DPD actuator from digital domain to analog domain; and
an analog-to-digital converter (ADC) located on the second path, wherein the ADC converts signals to the EC actuator from analog domain to digital domain.

11. A method executed at an integrated circuit in a cable network, the method comprising:
providing samples of signals traversing a first path and a second path in the integrated circuit to a signal processor over a data interface;
receiving DPD coefficients, EC coefficients and delay parameters over the data interface from the signal processor;
predistorting first signals on the first path using the DPD coefficients by a DPD actuator located on the first path, wherein the predistortions compensate for distortions introduced by an amplifier located on the first path; and
reducing interferences on second signals on the second path using the EC coefficients and delay parameters by an EC actuator located on the second path, facilitating FDX communication by the integrated circuit in a cable network, wherein the signal processor samples the first signals and the second signals traversing the integrated circuit and computes the DPD coefficients, EC coefficients and delay parameters offline at a predetermined interval.

12. The method of claim 11, wherein the data interface comprises at least four channels providing data from the integrated circuit to the signal processor, wherein the at least four channels comprises:
a first channel (D1) providing samples of the first signals into the DPD actuator on the first path,
a second channel (D2) providing samples of the first signals out of the amplifier on the first path,
a third channel (D3) providing a base band (BB) portion of the first signals on the first path, and
a fourth channel (D4) providing a BB portion of the second signals on the second path.

13. The method of claim 12, wherein the data interface further comprises at least three additional channels providing data from the signal processor to the integrated circuit, wherein the at least three additional channels comprises:
a fifth channel (C1) providing the a first portion of the DPD coefficients computed using the data provided over the first channel and the second channel,
a sixth channel (C2) providing a second portion of the DPD coefficients computed using the data provided over the first channel and the second channel, and
a seventh channel (C3) providing the EC coefficients and the delay parameters using the data provided over the third channel and the fourth channel.

14. The method of claim 11, wherein the data interface comprises at least five channels providing data from the integrated circuit to the signal processor, wherein the at least five channels comprises:
a first channel (D1) providing samples of the first signals into the DPD actuator on the first path,
a second channel (D2) providing samples of the first signals out of the amplifier on the first path,
a third channel (D3) providing a BB portion of the first signals on the first path,
a fourth channel (D4) providing a BB portion of third signals on a third path, and
a fifth channel (D5) providing a BB portion of the second signals on the second path, wherein an ADC is located on the third path between an output of the amplifier and the EC actuator.

15. The method of claim 14, wherein the data interface further comprises at least two additional channels providing data from the signal processor to the integrated circuit, wherein the at least two additional channels comprises:
a sixth channel (D6) providing the DPD coefficients computed using the data provided over the first channel and the second channel, and
a seventh channel (D7) providing the EC coefficients and the delay parameters using the data provided over the third channel, the fourth channel and the fifth channel.

16. Non-transitory tangible computer-readable media that includes instructions for execution, which when executed by an integrated circuit, is operable to perform operations comprising:
providing samples of signals traversing a first path and a second path in the integrated circuit to a signal processor over a data interface;
receiving DPD coefficients, EC coefficients and delay parameters over the data interface from the signal processor, wherein the signal processor computes the DPD coefficients, EC coefficients and delay parameters using the samples of the signals;
predistorting first signals on the first path using the DPD coefficients by a DPD actuator located on the first path, wherein the predistortions compensate for distortions introduced by an amplifier located on the first path; and
reducing interferences on second signals on the second path using the EC coefficients and delay parameters by an EC actuator located on the second path, facilitating FDX communication by the integrated circuit in a cable network, wherein the signal processor samples the first signals and the second signals traversing the integrated circuit and computes the DPD coefficients, EC coefficients and delay parameters offline at a predetermined interval.

17. The media of claim 16, wherein the samples of the first signals and the second signals are provided to the signal processor when a trigger is received by the integrated circuit.

18. The media of claim 16, wherein the predistorting by the DPD actuator and the reducing interferences by the EC actuator are performed as the signals traverse the integrated circuit.

* * * * *